United States Patent
Sesia et al.

(10) Patent No.: US 11,172,371 B2
(45) Date of Patent: Nov. 9, 2021

(54) IOT GOES UNLICENSED

(71) Applicant: Apple Inc., Cupertino, CA (US)

(72) Inventors: Stefania Sesia, Roquefort les Pins (FR); Jose A. Cesares Cano, Munich (DE); Christian Drewes, Germering (DE); Sabine Roessel, Munich (DE)

(73) Assignee: Apple Inc., Cupertino, CA (US)

( * ) Notice: Subject to any disclaimer, the term of this patent is extended or adjusted under 35 U.S.C. 154(b) by 81 days.

(21) Appl. No.: 16/489,475

(22) PCT Filed: Mar. 28, 2017

(86) PCT No.: PCT/US2017/024446
§ 371 (c)(1),
(2) Date: Aug. 28, 2019

(87) PCT Pub. No.: WO2018/182573
PCT Pub. Date: Oct. 4, 2018

(65) Prior Publication Data
US 2021/0144560 A1    May 13, 2021

(51) Int. Cl.
*H04W 72/04* (2009.01)
*H04W 16/14* (2009.01)
(Continued)

(52) U.S. Cl.
CPC ............ *H04W 16/14* (2013.01); *H04L 5/001* (2013.01); *H04L 5/0053* (2013.01); *H04W 4/70* (2018.02);
(Continued)

(58) Field of Classification Search
CPC ...... H04L 5/001; H04L 5/0053; H04W 16/14; H04W 4/70; H04W 72/0413; H04W 72/042; H04W 72/0453
See application file for complete search history.

(56) References Cited

U.S. PATENT DOCUMENTS

2015/0223243 A1* 8/2015 Tabet ............... H04L 5/001
                                                                        370/330
2016/0191107 A1* 6/2016 Khlat ............... H04L 27/0002
                                                                        370/328
(Continued)

FOREIGN PATENT DOCUMENTS

WO    2017/039739 A1    3/2017

OTHER PUBLICATIONS

International Search Report dated Jan. 4, 2018 for International Application No. PCT/US2017/024446.
(Continued)

*Primary Examiner* — Chi Ho A Lee
(74) *Attorney, Agent, or Firm* — Eschweiler & Potashnik, LLC

(57) ABSTRACT

Machines or networked devices such as internet of things (IoT) devices operate to generate an unlicensed narrowband (U-NB) IoT communication based on time domain multiple carrier aggregation operations with component carriers. These component carriers can comprise a component carrier that is anchored to a long term evolution (LTE) licensed band, or entirely comprise unlicensed carrier components that are unanchored to the LTE component carrier in a standalone configuration. Communication circuitry such as a radio frequency interface can transmit the U-NB IoT communication in standalone communications over a low power IoT network in an unlicensed band.

23 Claims, 10 Drawing Sheets

(51) Int. Cl.
H04W 4/70 (2018.01)
H04L 5/00 (2006.01)
(52) U.S. Cl.
CPC ..... *H04W 72/042* (2013.01); *H04W 72/0413* (2013.01); *H04W 72/0453* (2013.01)

(56) References Cited

U.S. PATENT DOCUMENTS

| | | | |
|---|---|---|---|
| 2016/0309282 A1 | 10/2016 | Xu et al. | |
| 2017/0222951 A1* | 8/2017 | Shihab | H04W 16/14 |
| 2017/0289865 A1* | 10/2017 | Nakata | H04W 36/0011 |
| 2018/0020432 A1* | 1/2018 | Rico Alvarino | H04W 72/048 |
| 2018/0020452 A1* | 1/2018 | Yerramalli | H04B 1/713 |
| 2018/0083688 A1* | 3/2018 | Agiwal | H04W 12/033 |
| 2018/0097596 A1* | 4/2018 | Palanivelu | H04L 5/0048 |
| 2018/0270851 A1* | 9/2018 | Bhattad | H04W 72/1294 |
| 2020/0029392 A1* | 1/2020 | Ye | H04W 88/10 |
| 2020/0053516 A1* | 2/2020 | Sui | H04W 72/0453 |

OTHER PUBLICATIONS

"Outlook on Rel-15 NB-IoT enhancements." Source: Huawei, HiSilicon, Neul. Agenda: 10.1.1. 3GPP TSG RAN Meeting #74 , Vienna, Austria, Dec. 5-8, 2016. RP-163160.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description Stage 2 (Release 14). 3GPP TS 36.300 V14.1.0 (Dec. 2016). 318 pages.
"TDD support for NB-IoT in Rel-15" Source: Huawei, HiSilicon. Agenda item: 10.1.1. 3GPP Draft, RP-162161.
"New Study Item proposal: Licensed-Downlink Assisted NB-IoT." Source: Huawei, HiSilicon. Agenda Item: 10.1.1. 3GPP TSG-RAN Meeting #74, Vienna, Austria, Dec. 5-8, 2016. RP-162158. 8 pages.
"NB-IoT—downlink physical layer concept description." Source: Huawei, HiSilicon. Agenda Item: 6.2.6.2.2. 3GPP TSG RAN WG1 Meeting #83, Anaheim, USA, Nov. 15-22, 2015. R1-156462. 12 pages.
"NB-PBCH design." Source: Huawei, HiSilicon, Agenda Item: 2.1.1.1 3GPP TSG RAN WG1 NB-Iot Ad-Hoc Meeting, Budapest, Hungary, Jan. 18-20, 2016. R1-160023. 4 pages.
"Narrowband IOT—Uplink Design." Source: Samsung. Agenda item: 7.2.6.2.2. 3GPP TSG RAN WG1 Meeting #82bis, Malmo, Sweden, Oct. 5-9, 2015. R1-155514. 6 pages.
"Narrowband IOT—Downlink Control/Data Channel Design." Source: Samsung. Agenda Item: 7.2.6.2.2. 3GPP TSG RAN WG1 Meeting #82bis, Malmo, Sweden, Oct. 5-9, 2015. R1-155512. 8 pages.
Further discussion on the reference signal design for NB-IoT. Source: Spreadtrum Communications. Agenda item: 7.2.1.1.5. 3GPP TSG RAN WG1 #84, Malta, Feb. 15-19, 2016. R1-160820.
"Discussion on further enhancement of LAA for LTE." Source: ZTE. Agenda Item: 10.2.1. 3GPP TSG RAN Meeting #72, Busan, Korea, Jun. 13-17, 2016. RP-160926. 6 pages.
International Preliminary Report on Patentability dated Oct. 1, 2019 for International Application No. PCT/US2017/024446.

* cited by examiner

IOT GOES UNLICENSED

REFERENCE TO RELATED APPLICATIONS

This application is a National Phase entry application of International Patent Application No. PCT/US2017/024,446 filed Mar. 28, 2017 entitled "IoT GOES UNLICENSED" in the name of Stefania Sesia et al. and is hereby incorporated by reference in its entirety.

FIELD

The present disclosure is in the field of internet of things (IoT) communication, and more specifically, pertains to IoT devices communicating in the unlicensed spectrum.

BACKGROUND

Wireless mobile communication technology uses various standards and protocols to transmit data between a node (e.g., a transmission station) and a wireless device (e.g., a mobile device), or a user equipment (UE). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the access node can be an Evolved Universal Terrestrial Radio Access Network (E-UTRAN) Node Bs (also commonly denoted as evolved Node Bs, enhanced Node Bs, eNodeBs, or eNBs) with or without one or more Radio Network Controllers (RNCs), which can communicate with the UE. The DL transmission can be a communication from an access point/node or base station (e.g., a macro cell device, an eNodeB, an eNB, WiFi node, or other similar network device) to the UE, and the UL transmission can be a communication from the wireless network device to the node.

Additionally, the Internet of Things (IoT) is beginning to grow significantly, as consumers, businesses, and governments recognize the benefit of connecting devices to the internet. A significant segment of this industry is intended to operate over vast areas under the initiative low-power widearea networking (LP-WAN), which is supposed to provide a global solution for both licensed and unlicensed spectrum. The following cellular technologies recently standardized in 3GPP are meant to operate in licensed spectrum: enhanced coverage global system for mobile communication (GSM) based on general packet radio service (GPRS) standard in the context of Rel-13; the evolution of the LTE machine type communication (MTC) solution (commonly called Cat M1) which is based on an evolution of the legacy Cat 0; and narrowband (NB) IOT, a new non backward compatible radio access technology which is specifically optimized in order to satisfy the requirements required for typical IoT solutions (commonly called Cat NB1).

In the recent years several proprietary technologies have been developed to operate in the unlicensed spectrum. These technologies, however, do not allow operators to leverage the investments done for the deployment of LTE, as many of them cannot easily interwork with existing networks and require separate deployments.

DETAILED DESCRIPTION

Figure 1:
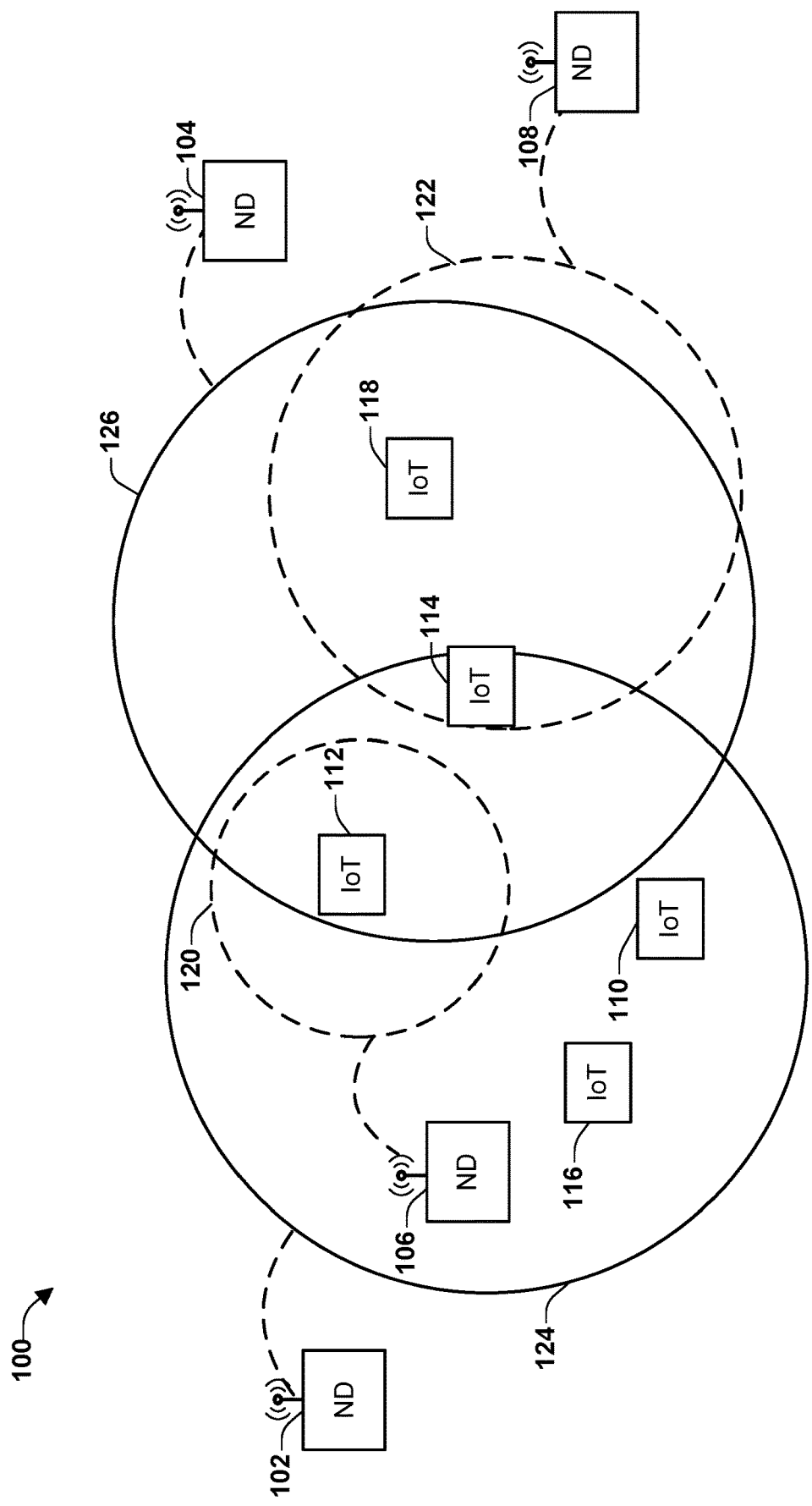
FIG. 1 illustrates a block diagram of an example wireless communications network environment for a UE or eNB according to various aspects or embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Introduction

In consideration of described deficiencies of radio frequency communication and synchronization operations, various aspects for unlicensed use of cellular IoT technologies to operate in unlicensed spectrum. Unlicensed IoT devices, for example, can fairly coexist with existing wireless technologies according to various aspects/embodiments described herein. Such techniques or networked IoT devices can be referred to herein as unlicensed IoT (U-IoT) and can be applicable to any IoT related standard from extended coverage GSM IoT (EC-GSM-IoT) to enhanced machine type communication (eMTC) and NB-IOT, for example, in future evolutions under discussion.

3GPP has developed a set of specific requirements/key performance indicators (KPIs) for the IoT service, among others, low complexity, low data rate, low sensitivity to delay, low power consumption and low cost. Operators having heavily invested in licensed spectrum, could want to prioritize mobile broadband solutions in those expensive spectrum chunks rather than less costly services like IoT. Thus, an IoT operation or IoT devices in the unlicensed spectrum could incur lower deployment costs, and lower power consumption with increased efficiency of operation with respect to these KPIs.

IoT devices can operate in unlicensed spectrum with different deployment modes based on a time domain carrier aggregation principle of a new radio access technology (RAT). In some aspects, an IoT device can operate to generate an unlicensed narrowband (U-NB) IoT communication based on a time domain multiple carrier aggregation of a plurality of component carriers. The component carriers can comprise a component carrier that is anchored to a long term evolution (LTE) licensed band, or they can entirely comprise unlicensed carrier components that are unanchored to the LTE component carrier in a standalone configuration, where LTE-based technology solely operates in unlicensed spectrum without requiring an "anchor" in licensed spectrum. A radio frequency interface can be configured to communicate the U-NB IoT communication. Additional aspects, embodiments or details of the disclosure are further described below with detail in reference to figures.

FIG. 1 illustrates an example non-limiting wireless communications environment 100 that can enable IoT devices to communicate U-NB IoT communications based on a time domain multiple carrier aggregation of component carriers. These component carriers can comprise a component carrier that is anchored to an LTE licensed band, or the component carriers can be entirely comprised of unlicensed component carrier components. The time domain multiple carrier aggregation of the component carriers can include a time domain inter-frequency carrier aggregation among the component carriers. As such, the time domain multiple carrier aggregation can include performing multiple carrier aggregation operation with inter-band and non-contiguous spectrum, which can be performed in IoT devices with only radio frequency (RF) chain tuned to one spectrum band, for example, as the time domain inter-frequency carrier aggregation.

Inter-band spectrum can refer to different frequency spectrum bands (or frequency ranges) with time domain multiple carrier aggregation operable between the different spectrum bands instead of just within one band. Non-contiguous can refer to a non-continuous or non-touching component carrier within a band or between different bands (or ranges of frequency spectrum), for example. Non-contiguous time domain multiple carrier aggregation could be either intra-band, where the component carriers belong to the same operating frequency band, but could have one or more gaps in between, or it could be inter-band, in which case the component carriers belong to different operating frequency bands entirely and are also not contiguous.

Wireless communications environment 100, for example, can include one or more broadcast servers or macro cell network devices 102, 104 (e.g., base stations, eNBs, access points (APs) or other similar network devices) as well as one or more other network devices such as small cell network devices, APs or other similar network device 106, 108 deployed within the wireless communications environment 100 and servicing one or more UE/IoT devices 110, 112, 114, 116, 118 for wireless communications.

A UE/IoT device 110, 112, 114, 116, or 118 can be considered IoT devices including a wireless device such as a mobile/wireless phone, an IoT device or machine device that is operable to communicate in a machine-to-machine (M2M) protocol, a MTC protocol, an IoT protocol such as an unlicensed IoT (U-IoT) communication, unlicensed narrowband (U-NB IoT) communication or the like, and can be applicable to communicate in any IoT related standard from EC-GSM-IOT to eMTC and NB-IOT, for example. Such U-NB IoT devices can be primarily utilized as a device communicatively coupled in a cellular network to any one of the eNBs 102-108 and as any one of the UE or IoT devices 110-118. IoT devices can also be considered machines that operate on a low power network or a network with lower power than UEs on a cellular network such as a Low Power Wide Area (LPWA) network or a WiFi network with less (or in-frequent) communication flows with longer delays in-between than LTE networks, for example. IoT devices can include thermostats, light bulbs, door locks, fridges, cars, implants for RFID and pacemakers, or other non-processing devices or processing devices.

The UE device 110, 112, 114, 116, or 118 can contain some or all of the functionality of a system, subscriber unit, subscriber station, mobile station, mobile, wireless terminal, network device, mobile device, remote station, remote terminal, access terminal, user terminal, terminal, wireless communication device, wireless communication apparatus, user agent, user device, or other ND, for example. Although only five UE devices 110, 112, 114, 116, 118 are illustrated, any number of UE devices can be deployed within the wireless communications environment 100 as well.

Each wireless communications network, cellular broadcast servers 102, 104 and small cell network devices 106, 108 can comprise network devices (NDs), in general, which can operate in conjunction in order to process network traffic for the one or more IoT or UE devices 110, 112, 114, 116, or 118 as cellular broadcast servers 102, 104, small cell network devices 106, 108, or be an IoT or UE devices 110, 112, 114, 116, or 118. For example, macro cell NDs 102, 104 can comprise a set of network devices that are cellular enabled network devices or IoT enabled network devices. In another example, the cellular network devices 106, 108 can include a set of network devices that operate with a smaller coverage zone than the macro cell network devices 102 and 104, for example, or control similar coverage zones as the macro cell devices. As one of ordinary skill in the art can appreciate, this disclosure is not limited to any one network environment architecture/deployment.

Although NDs 106 and 108 are described as cellular network devices, they can also be cellular network devices (macro cell base stations or small cell base stations), or some other type of ND operable as a base station, eNB, for example, associated with a secondary (WiFi or IoT network) cell network device or network provider device. Alternatively, one or more of the macro cell NDs 102 and 104 could be cellular network devices or other NDs of a different radio access technology (RAT) that operate with different frequency carriers, for example, as small eNBs, micro-eNBs, pico-eNBs, Femto-eNBs, home eNBs (HeNBs), or secondary cell devices also.

Each of the one or more cellular broadcast servers or macro cell NDs 102, 104 can have a corresponding service area 124, 126. However, it should be understood that the wireless communications environment 100 is not limited to this implementation. For example, any number of APs or NDs with respective service areas can be deployed within the wireless communications environment 100. Further, any number of cellular broadcast servers and respective service areas can be deployed within the wireless communications environment 100 as well.

In an example scenario, UE devices 110, 112, 114, 116, or 118 can be serviced by networks through the macro cell NDs 102, 104, or directly through the small cell NDs 106, 108 in a licensed assisted access (LAA) or a standalone manner (e.g., in IoT standalone communications with the WiFi nodes 106, 108 without assistance from the network devices/eNBs 102, 104). As a UE/IoT device 110, 112, 114, 116, or 118 moves within the wireless communications environment 100, the respective user equipment/IoT device could move in and out of the coverage area of the associated serving network. For example, as a UE is sending/receiving communications through their respective communication circuitry (e.g., receiver/transmitter circuitry), the user could be walking, riding in a car, riding on a train, moving around a densely populated urban area (e.g., a large city), wherein the movement could cause the mobile device to be moved between various wireless communication networks. In such cases, it can be beneficial for the UE to route the network traffic (e.g., handoff) from a serving ND to a target ND in order to continue the communication (e.g., avoid dropped calls) or facilitate offloading for load distribution or other efficiency purposes, such as via LAA to unlicensed bands, or in a standalone manner in a U-NB IoT communication. U-NB IoT communications includes the support of the Low Power Wide Area network applications that demand extreme extended coverage, low cost, and long batter life. Also, a large number of connected devices deployed "in-band" in spectrum allocated to LTE for utilizing resource blocks within a normal LTE carrier, or in the unused resource blocks within a LTE carrier guard band or standalone for a dedicated spectrum.

LTE Cat NB1 can include U-NB IoT devices 110, 112, 114, 116, or 118 with a nominal receive bandwidth of 200 kHz, for example. The NB-IoT devices can also comprise a single receiver/transmit chain that can be configured to transmit/receive within the narrowband frequency spectrum. For example, the communication interface (radio frequency (RF) interface) or communication circuitry of each U-NB IoT devices 110, 112, 114, 116, or 118 can have a radio frequency chain configured to operate in only one frequency band instead of more than one or with multiple chains corresponding to different frequency bands. As such, the IoT devices can communicate the U-NB IoT communication for downlink and uplink with different carriers by utilized the time domain multiple carrier aggregation operations, and the U-NB IoT communication can include a Cat NB 1 communication over a low power IoT network. In particular, this reduces complexity and each UE or IoT devices does not have to simultaneously support reception or transmission of more than one communication stream, process flow or frequency stream for different kinds of communications at once.

Macro cell NDs 102, 104 or small cell NDs 106, 108 can operate to monitor their surrounding radio conditions (e.g., by employing respective measurement components). For example, each of the macro cell NDs 102, 104 and small cell NDs 106, 108 can determine network traffic load on its respective network by performing a network diagnostic process. As an example, during a network listen procedure, such as a listen before talk (LBT) protocol/procedure macro cell NDs 102, 104, small cell NDs 106, 108 or UE/IoT devices 110, 112, 114, 116, 118 can scan their radio environment to determine network performance statistics or network parameters (e.g., frequency, SNR, signal quality, QoS, QoE, load, congestion, signal rate, etc.). Various parameters associated with macro cell NDs 102, 104, small cell NDs 106, 108, or UE devices 110, 112, 114, 116, 118 can be detected during the network diagnostic or LBT procedure or measurements, such as, but not limited to, frequency bands, scrambling codes, common channel pilot power, bandwidth across respective networks, universal mobile telecommunications system terrestrial radio access receive signal strength indicator, as well as frequency carrier priorities for particular cell groups (e.g., a normal group or a reduced group) and so on.

In one embodiment, the UE devices 110, 112, 114, 116, or 118 can operate in the narrow band IoT and be configured to perform a duplex multi-carrier operation, as a multi-carrier operation that is extended to employ unlicensed carriers for the narrow band operation. These UE or IoT devices 110, 112, 114, 116, or 118 can also be non-collocated anchored. Non-collocated deployments have the eNB and WiFi nodes, or other nodes at separate devices or components that are independent and separate from one another. The UE/IoT devices 110, 112, 114, 116, or 118 can be configured to operate based on non-collocated anchoring of unlicensed and inter-frequency multi-carrier operation of NB IoT. The narrow band IoT for licensed spectrum, for example, can meet certain requirements (contiguous and intra-band) for how close the carriers being utilized for time division multiple carrier aggregation (TDMCA) operations are located with respect to one another.

For example, the carriers can be in the same channel so they can be intra-band and in a really contiguous spectrum so that synchronization, frequency drift, timing behavior, can be more or less contiguous or harmonized between the anchoring carrier and the additional carrier where the UE communication can jump into for operation in order to off-load, handover or effectively communicate. If carrier operations are based on a combination of carriers, by this principle, having an anchored carrier in licensed spectrum and a non-anchored carrier in unlicensed spectrum can cause such requirements of intra-band, contiguity lost or forfeited by definition and TDMCA operations are neither in the same frequency band or have contiguous spectrum.

Embodiments herein can enable non-collocated anchoring of unlicensed and inter-frequency multi-carrier operation in order to support non-collocated anchoring of unlicensed and inter-frequency, non-contiguous multi-carrier operation of NB IoT. NB-IoT multi-carrier operation (MCO) in one embodiment is not constrained by the total frequency span being below or at 20 MGhz and both NB-IoT one PRB basic carriers being synchronized. As such, the LTE channel, the 20 MHz, can be left and operations of IoT devices be enabled into another frequency band so that TDMCA operations are non-frequency contiguous (not frequency contiguous/non-contiguous). As such, two channels can be available by which the IoT devices 110, 112, 114, 116, or 118 can operate in based on TDMCA operations: an anchored component carrier and an additional unanchored component carrier, which are not synchronized.

In some embodiments, these carriers can be synchronized separately on the anchored carrier and on the additional unanchored/unlicensed carrier. The synchronized, for example, can be enabled in a UL/DL grant or be grant-less, by which the UE or IoT device to initiate on a particular resource of time/spectrum band, for example.

IoT devices 110, 112, 114, 116, or 118 can operate in the unlicensed spectrum for both UL and DL communications in a standalone NB communication. In this aspect, the IoT devices can communicate U-NB communications with time domain multiple carrier aggregation operations without any licensed assistance from one or more NDs or eNBs 102, 104. For example, in this case the IoT devices can operate similar to MulteFire devices operating solely on the unlicensed band with time domain multiple carrier aggregation operations carrier out for MCO on different inter-, intra-bands with only one RF communication chain, thus eliminating further complexity by not having to simultaneously receive different streams or communication flows.

Alternatively or additionally, the IoT devices 110, 112, 114, 116, or 118 can operate by using the licensed spectrum for certain channels. The split between which channels can transmit on the licensed carrier and which channels can transmit on the unlicensed carrier can be dynamic or flexible. The synchronization signals (e.g., primary synchronization signals (PSS), or secondary synchronization signals (SSS)) can be transmitted on both carriers (licensed and unlicensed carriers), which are being utilized in the TDMA operations.

In addition to the synchronization signals being transmitted on both carriers (licensed and unlicensed) being utilized in anchored configurations, in further aspects, a master information block (MIB) can be transmitted on the licensed carrier, while concurrently one or more of: a system information block (SIB), a U-NB physical downlink control channel (U-NPDCCH), a U-NB physical downlink shared channel (U-NPDSCH), a U-NB physical uplink shared channel (U-NPUSCH), or a U-NB physical random access channel (U-NPRACH) can be transmitted in the unlicensed carrier. Further, these aspects can be applicable when both DL and UL carriers in unlicensed spectrum are present or utilized with the time domain multiple carrier aggregation operations for communication.

In other embodiments, synchronization signals can be transmitted on both the carriers, concurrent with the MIB and SIB can be transmitted on the licensed carrier as well as one or more of: the U-NPDCCH, the U-NPDSCH, the U-NPUSCH, or the U-NPRACH being transmitted in the unlicensed carrier. This can be applicable also when both DL and UL carriers in unlicensed spectrum are present or utilized with time domain multiple carrier aggregation operations for communication.

In other further embodiments, synchronization signals can be transmitted on both the carriers, concurrent with the MIB and SIB, as well as the U-NPDCCH can be transmitted on the licensed carrier, and one or more of: the U-NPDSCH, U-NPUSCH, or U-NPRACH being transmitted in the unlicensed carrier. This can be applicable also when both DL and UL carriers in unlicensed spectrum are present or utilized with time domain multiple carrier aggregation operations for the communication.

In yet another embodiment applicable to the above embodiments, when only the unlicensed spectrum or unlicensed carrier is used for DL and not UL communication, U-NPUSCH and U-NPRACH can be communicated or use the licensed spectrum. Alternatively or additionally, another embodiment can be the same as the above, but with U-NPDSCH in licensed spectrum in case the unlicensed spectrum is only used for UL.

Figure 2:
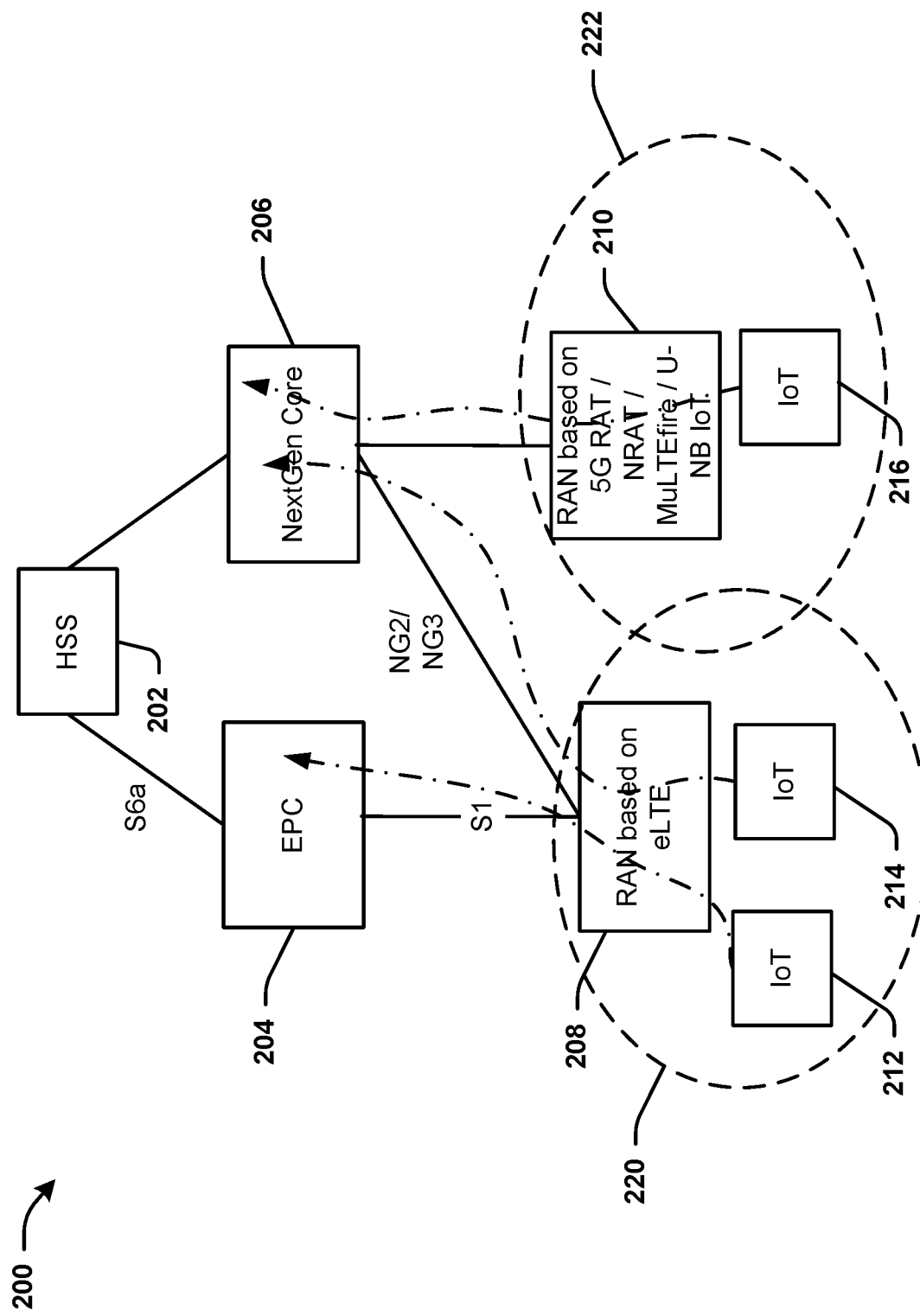
FIG. 2 illustrates another block diagram of an example of wireless communications network environment for a UE or eNB according to various aspects or embodiments.

Referring to FIG. 2, illustrated is an example network configured to enable the operation of legacy network devices, NextGen network devices (network devices based on a 5G network), new radio (NR) network devices, as well as IoT network devices for standalone systems or anchored LTE systems, for example, which can be independent or communicatively coupled in one or more networks. These network devices can be configured to communicate via a communication protocol stack, which can be based on an Open Source Interconnected (OSI) model and defines the networking framework for implementing communication protocols among the various layers. Control can be passed from one layer to the next, starting at an application layer in one station or node, for example, proceeding to a bottom layer, over a channel to a next station and back up the hierarchy.

The network system 200 is an example of an interworking architecture for potential interworking between a legacy network (e.g., the evolved packet core (EPC) 204 in the LTE on the left hand side) and the NextGen core 206 with the 5G radio (e.g., the RAN 210 based on 5G RAT including an IoT RAT on the right hand side). Each component, individually or together can be a component of an eNB, separate eNBs or WiFi nodes as either of the RANs 208 and 210 operatively coupled to or comprising both the EPC 204 and the NextGen core 206. The EPC 204 and NextGen core 106 can each be connected to the home subscriber service (HSS) 202, such as via one or more interfaces (e.g., an S6a interface to the EPC 204 or other interface). The HSS 102 can include one or more databases for network users, including subscription-related information to support the network entities' handling of communication sessions. For example, the HSS 202 can provide support for routing/roaming, authentication, authorization, naming/addressing resolution, location dependencies, etc. The network 200 can comprise one or several HSSs 202, depending on the number of mobile subscribers, on the capacity of the equipment, on the organization of the network, etc.

The UE or IoT devices 212, 214, 216 (e.g., IoT devices 110-118) signaling can be based on whether the device is capable or not to determine if the communication flow would be steered either to the EPC core 204 or the NextGen core 206. The EPC core 204 can enable an anchored IoT network device/system (or a U-IoT anchored network that is configured U-NB TDMCA operations having an anchored LTE carrier as discussed herein), while the NextGen Core 206 could enable either the U-IOT anchored network or an unanchored IoT network device/system that is a standalone IoT network device (or a U-IoT standalone network with U-NB TDMCA operations having all component carriers as unanchored non-LTE carriers as discussed herein).

On the left side, a legacy UE 212 and the 5G UE 214 can connect to the LTE eNB with RAN based on LTE 208, and the legacy UE 212 has traffic handled over the S1 interface to the EPC 204, in one example, while the 5G UE 214 can have communications directed to the NextGen core 206 over the NG2/NG3 interface(s), which can support infrastructure that can include licensed assisted accessed (LAA), enhanced LAA (eLAA), New radio, internet of things/machine to machine, IoT, MulteFire or the like. Thus, the communication handling can be different for different IoTs/UEs so that one type of communication handling can be enabled for one type of UE such as an IoT or another type of UE such as a mobile device or other network device, as well as whether the device is configured for standalone (e.g., U-IoT standalone) or anchored (e.g., U-IoT anchored) network TDMCA operations.

The components of the RAN based on LTE 208 can be employed in or as an eNB of a RAN based LTE or evolved LTE 208 configured to generate and manage cell coverage area/zone 220, while another eNB of a RAN based on 5G RAT/new RAT (NRAT)/MulteFire/U-IoT 210 can control the 5G/IoT standard based cell area 222. Although depicted as multiple coverage areas, this is only one example architecture and is not confined to any one or more cell coverage areas as illustrated on the right and left of the system 200.

In one embodied aspect, a network device/system can operate only on the unlicensed spectrum without an anchor in the licensed spectrum, and thus, relies on the unlicensed spectrum for communication signaling, such as via a WiFi node through to an eNB as the RAN 210, for example, either collocated or non-collocated according to one or more various TDMCA operations.

Figure 3:
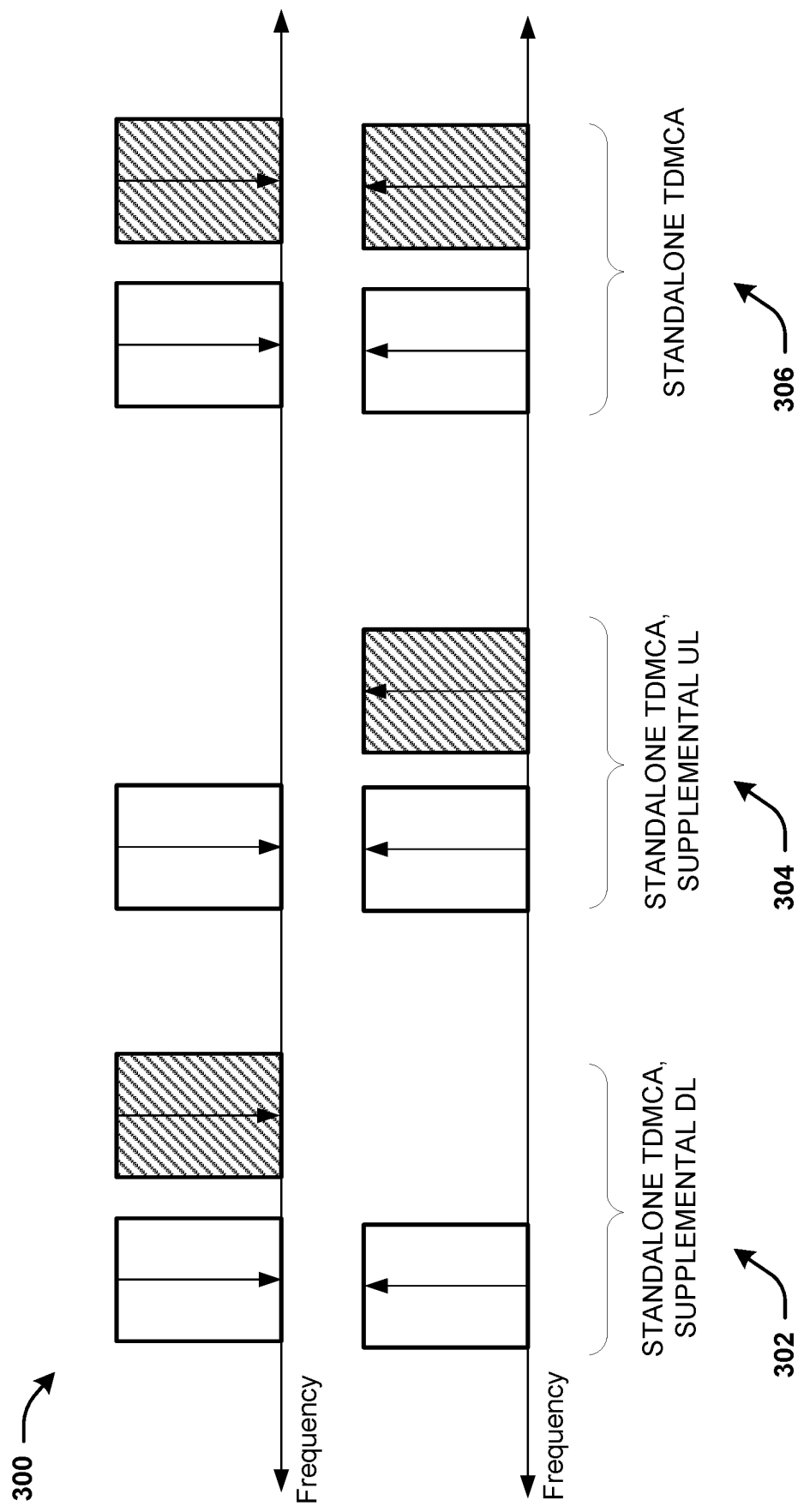
FIG. 3 is a block diagram of component carriers for TDMCA operation in a standalone case (CA in unlicensed spectrum only) according to various aspects or embodiments described herein.

Referring to FIG. 3, illustrated is an example of time division multiplex carrier aggregation (TDMCA) operations 300 (e.g., time division multiple access operations (TDMA) for NB-IoT multi-carrier operation (MCO) operations) in a standalone case (CA in unlicensed spectrum only) via one or more network devices illustrated herein. For example, network devices such as macro cell base stations (102, 104), small cell base stations (106, 108), or other IoT access points or IoT UE devices acting as relays (e.g., UE devices 110, 112, 114, 116, or 118) can operate according to different TDMCA operations or parameters related to TDMCA operations based on unlicensed carriers entirely, or based on licensed and unlicensed carriers.

The TDMCA operations 300, for example, can include UL and DL carriers utilized in anchored operations for IoT, or without an anchored carrier. Uplink carriers are illustrated in FIG. 3 with an upward arrow or an arrow facing upward, and downlink carriers care illustrated with a downward arrow or an arrow facing downward. For example, blocks representing carriers along the top-most frequency line/axis are illustrated as DL carriers and blocks representing carriers or component carriers on the bottom-most frequency line/axis are uplink carriers.

Additionally, components carriers 302-306 represented with hash lines or hash marks can be considered supplemental carriers and those without any markings representing a component carrier can be primary carriers. Based on the TDMCA operations, an IoT or network device can communicate from one component carrier on the frequency spectrum to another for offloading data.

Each set of DL carriers and associated UL carriers 302-306 can represent a different TDMCA operation to support U-IoT operation. For example, TDMCA operation 302 comprises both DL and UL component carriers. The DL component carriers can include both primary and supplemental carriers, while the UL includes only a primary carrier without a supplemental UL carrier. In the component carriers for TDMCA operation 304, for example, the UL component carriers can include both primary and supplemental carriers, while the DL includes only a primary carrier.

In another example, the TDMCA operation 306 can include supplemental carriers in both UL and DL. The supplemental carriers are in unlicensed spectrum and are used in TDMCA anchored mode. Another possible mode of operation is the stand-alone unlicensed operation. Not shown in FIG. 3 is that DL and UL carriers in unlicensed spectrum are not anchored.

In all cases of TDMCA operation, stand-alone or anchored TDMCA operation can mean that at least two carriers operating in TDMCA do not require the possibility that the primary cell and the secondary cells are to be used simultaneously. So the TDMCA does not intertwine the operations the way it is performed for the multi-carrier operation where one of carriers is the primary cell and other carriers are secondary in the sense that the latter does not have all the information needed, which can be indicated by signaling or pre-determined.

Figure 4:
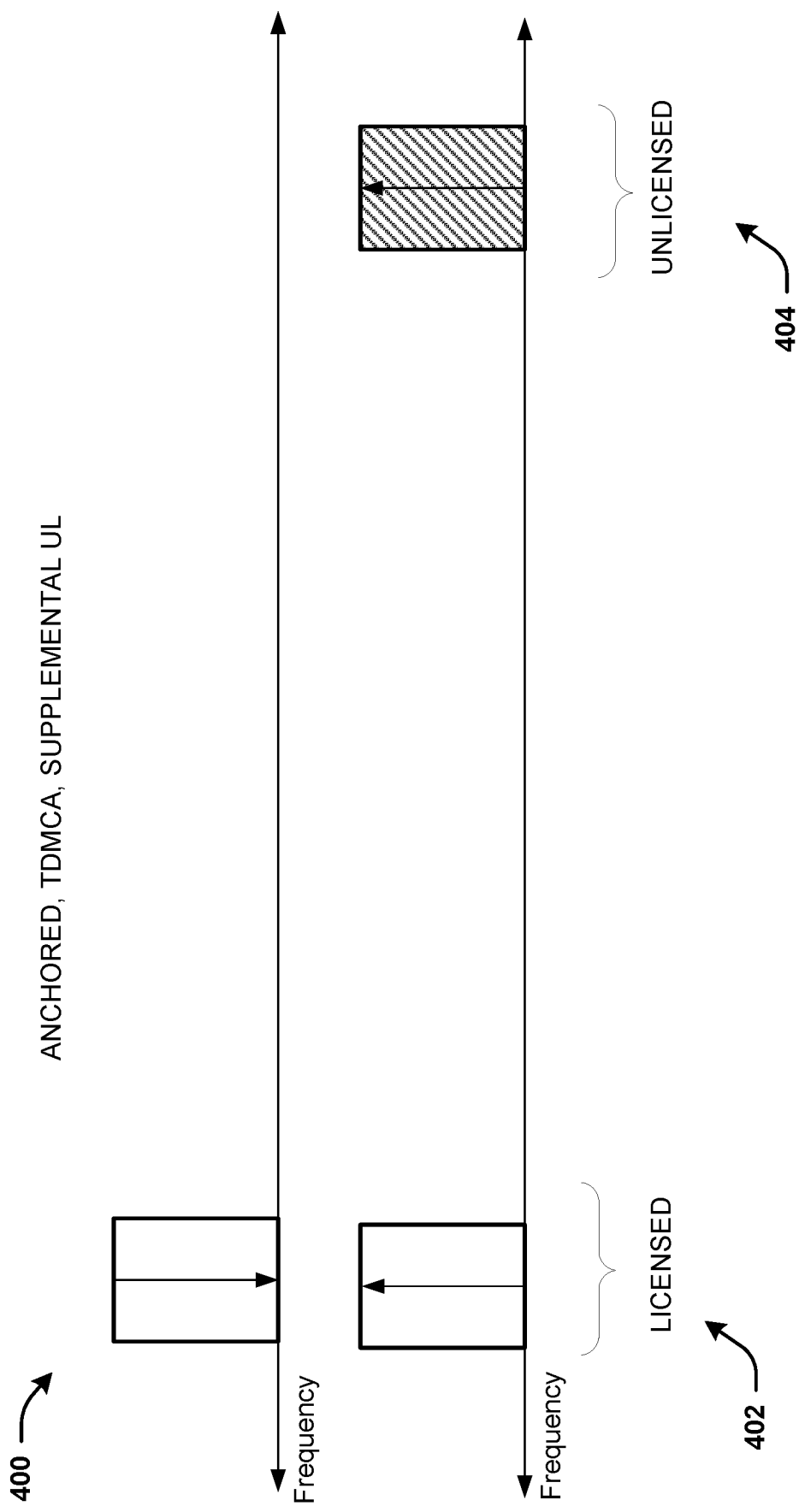
FIG. 4 is another block diagram of component carriers for TDMCA operation according to various aspects or embodiments described herein.

Referring to FIG. 4, illustrated is another example of TDMCA operations for NB-IoT multi-carrier operation (MCO) operations. As stated above, network devices such as macro cell base stations (102, 104), small cell base stations (106, 108), or IoT UE devices acting as relays (e.g., UE devices 110, 112, 114, 116, or 118) can operate according to different TDMCA operations or parameters related to TDMCA operations based on licensed and unlicensed carriers as shown here.

In one example, TDMCA operation 400 demonstrates an anchored TDMCA operation where one carrier can be a licensed carrier 402 and the other carrier can be an unlicensed carrier 404. Here, the primary carrier 402 can be the licensed carrier, as a licensed anchor, while the supplemental carrier 404 can be the unlicensed carrier. A UL supplemental carrier 404 can therefore be used as the supplemental carrier for TDMCA (e.g., TDMA) operations that are anchored.

In other examples, TDMCA operations can be anchored also when the unlicensed spectrum is used as the supplemental downlink and have the licensed carrier as the primary carrier in UL and the unlicensed carrier 404 as the supplemental UL carrier. Alternatively or additionally, the unlicensed spectrum can be used for both DL and UL, as a supplemental carrier or as a primary carrier.

The anchored approach, for example, in TDMCA operations 400 can be enabled when the DL and UL unlicensed frequency blocks vary in duplex gap. The duplex gap, for example, can be a particular set or range of frequencies, with the uplink above it and the downlink below in order to prevent interference. One duplex gap can be at one set of frequencies, while another duplex at another set of frequencies. For example, a top part (or upper range) of 600 MHz licenses can be 5 MHz for uplink that allows mobile devices to upload information, while a bottom part (or bottom range) can be 5 MHz of the 600 MHz range that allows downloading of information. In between the lower range and the upper range can be a duplex gap of about 11 MHz that remains empty to act as a guard band between the uplink and the downlink to keep them from interfering. Other examples can also be envisioned as well.

In one example, these component carriers can be time division mutually exclusively used (e.g., as shown in FIG. 3), as the carriers can be either one or the other (e.g., licensed/unlicensed, or primary/supplemental) and independent of whether these carriers are already synchronized or not. In the upper line for DL carriers they can be already synchronized, for example, which is typically not the case with the unlicensed, versus the licensed case as in FIG. 4. As such, the example TDMCA operations and associated carriers can be applicable to both carriers (primary and supplemental), either both unlicensed or both licensed, so that they are ideally sufficiently synchronized and maybe even contiguous with one another along the frequency spectrum horizontally without gaps or without variable gaps therebetween. The TDMCA operation 400 however demonstrates non-contiguity in comparison between the two carriers in UL, and that the carriers involved in TDMA can also vary in the gap or among bands, without being in the same band or contiguous, next to one another or with a uniform gap there-between.

In another example, DL and UL non-anchored carriers can be used and released independently or decoupled independently in time from one another. As such, the above example TDMCA operations 300 or 400 can further utilize licensed, unlicensed carriers, or both with additional synchronization according to further embodiments also described herein, or they can also be used in contiguous operations, either in both cases licensed or unlicensed.

Figure 5:
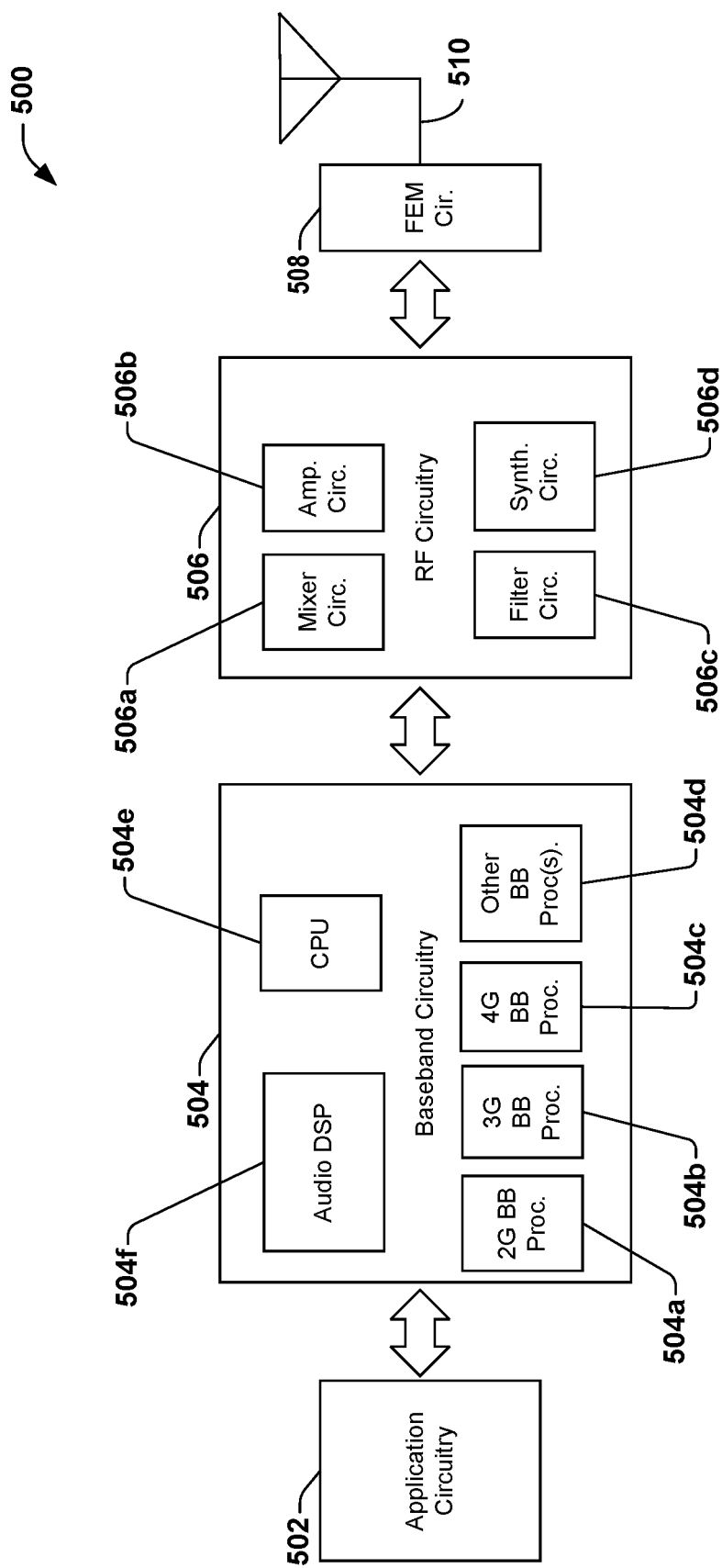
FIG. 5 illustrates an example system or network device operable with one or more components configured for various aspects or embodiments described herein.

Further embodiments related to synchronizing the component carriers of carriers 302-306, or 402, 404 in FIGS. 3-4 via the synchronization signals are described with more detail below with FIG. 5 as an example. Each and every structure or physical implementation of the different physical channels, how they are being filled, constructed, established in order to enable such TDMCA operations can be illustrated and described.

Embodiments described herein can be implemented into a system using any suitably configured hardware and/or software. FIG. 5 illustrates, for at least one embodiment, example components of a network device 500 such as an eNB 102-108 of FIG. 1, a UE/IoT device 110-118 of FIG. 1, or other similar network device 208-216 of FIG. 2. In some embodiments, the network device 500 can include application circuitry 502, baseband circuitry 504, Radio Frequency (RF) circuitry 506, front-end module (FEM) circuitry 508 and one or more antennas 510, coupled together at least as shown and can operate any one, all or a combination of operations or processes described within embodiments/aspects herein.

The application circuitry 502 can include one or more application processors. For example, the application circuitry 502 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 504 can include circuitry such as, but not limited to, one or more single-core or multi-core processors. The baseband circuitry 504 can include one or more baseband processors and/or control logic to process baseband signals received from a receive signal path of the RF circuitry 506 and to generate baseband signals for a transmit signal path of the RF circuitry 506. Baseband processing circuitry 504 can interface with the application circuitry 502 for generation and processing of the baseband signals and for controlling operations of the RF circuitry 506. For example, in some embodiments, the baseband circuitry 504 can include a second generation (2G) baseband processor 504a, third generation (3G) baseband processor 504b, fourth generation (4G) baseband processor 504c, and/or other baseband processor(s) 504d for other existing generations, generations in development or to be developed in the future (e.g., fifth generation (5G), 6G, etc.). The baseband circuitry 504 (e.g., one or more of baseband processors 504a-d) can handle various radio control functions that enable communication with one or more radio networks via the RF circuitry 506. The radio control functions can include, but are not limited to, signal modulation/demodulation, encoding/decoding, radio frequency shifting, etc. In some embodiments, modulation/demodulation circuitry of the baseband circuitry 504 can include Fast-Fourier Transform (FFT), precoding, and/or constellation mapping/demapping functionality. In some embodiments, encoding/decoding circuitry of the baseband circuitry 504 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 504 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 504e of the baseband circuitry 504 can be configured to run elements of the protocol stack for signaling of the PHY, MAC, RLC, PDCP and/or RRC layers. In some embodiments, the baseband circuitry can include one or more audio digital signal processor(s) (DSP) 504f. The audio DSP(s) 504f can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 504 and the application circuitry 502 can be implemented together such as, for example, on a system on a chip (SOC).

In some embodiments, the baseband circuitry 504 can provide for communication compatible with one or more radio technologies. For example, in some embodiments, the baseband circuitry 504 can support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 504 is configured to support radio communications of more than one wireless protocol can be referred to as multi-mode baseband circuitry.

RF circuitry 506 can enable communication with wireless networks using modulated electromagnetic radiation through a non-solid medium. In various embodiments, the RF circuitry 506 can include switches, filters, amplifiers, etc. to facilitate the communication with the wireless network. RF circuitry 506 can include a receive signal path which can include circuitry to down-convert RF signals received from the FEM circuitry 508 and provide baseband signals to the baseband circuitry 504. RF circuitry 506 can also include a transmit signal path which can include circuitry to up-convert baseband signals provided by the baseband circuitry 504 and provide RF output signals to the FEM circuitry 508 for transmission.

In some embodiments, the RF circuitry 506 can include a receive signal path and a transmit signal path. The receive signal path of the RF circuitry 506 can include mixer circuitry 506a, amplifier circuitry 506b and filter circuitry 506c. The transmit signal path of the RF circuitry 506 can include filter circuitry 506c and mixer circuitry 506a. RF circuitry 506 can also include synthesizer circuitry 506d for synthesizing a frequency for use by the mixer circuitry 506a of the receive signal path and the transmit signal path. In some embodiments, the mixer circuitry 506a of the receive signal path can be configured to down-convert RF signals received from the FEM circuitry 508 based on the synthesized frequency provided by synthesizer circuitry 506d. The amplifier circuitry 506b can be configured to amplify the down-converted signals and the filter circuitry 506c can be a low-pass filter (LPF) or band-pass filter (BPF) configured to remove unwanted signals from the down-converted signals to generate output baseband signals. Output baseband signals can be provided to the baseband circuitry 504 for further processing. In some embodiments, the output baseband signals can be zero-frequency baseband signals, although this is not a requirement. In some embodiments, mixer circuitry 506a of the receive signal path can comprise passive mixers, although the scope of the embodiments is not limited in this respect.

In some embodiments, the mixer circuitry 506a of the transmit signal path can be configured to up-convert input baseband signals based on the synthesized frequency provided by the synthesizer circuitry 506d to generate RF output signals for the FEM circuitry 508. The baseband signals can be provided by the baseband circuitry 504 and can be filtered by filter circuitry 506c. The filter circuitry 506c can include a low-pass filter (LPF), although the scope of the embodiments is not limited in this respect.

In some embodiments, the mixer circuitry 506a of the receive signal path and the mixer circuitry 506a of the transmit signal path can include two or more mixers and can be arranged for quadrature down-conversion and/or up-conversion respectively. In some embodiments, the mixer circuitry 506a of the receive signal path and the mixer circuitry 506a of the transmit signal path can include two or more mixers and can be arranged for image rejection (e.g., Hartley image rejection). In some embodiments, the mixer circuitry 506a of the receive signal path and the mixer circuitry 506a can be arranged for direct down-conversion and/or direct up-conversion, respectively. In some embodiments, the mixer circuitry 506a of the receive signal path and the mixer circuitry 506a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 506 can include analog-to-digital converter (ADC) and digital-to-analog converter (DAC) circuitry and the baseband circuitry 504 can include a digital baseband interface to communicate with the RF circuitry 506.

In some dual-mode embodiments, a separate radio IC circuitry can be provided for processing signals for each spectrum, although the scope of the embodiments is not limited in this respect.

In some embodiments, the synthesizer circuitry 506d can be a fractional-N synthesizer or a fractional N/N+1 synthesizer, although the scope of the embodiments is not limited in this respect as other types of frequency synthesizers can be suitable. For example, synthesizer circuitry 506d can be a delta-sigma synthesizer, a frequency multiplier, or a synthesizer comprising a phase-locked loop with a frequency divider.

The synthesizer circuitry 506d can be configured to synthesize an output frequency for use by the mixer circuitry 506a of the RF circuitry 506 based on a frequency input and a divider control input. In some embodiments, the synthesizer circuitry 506d can be a fractional N/N+1 synthesizer.

In some embodiments, frequency input can be provided by a voltage controlled oscillator (VCO), although that is not a requirement. Divider control input can be provided by either the baseband circuitry 504 or the applications processor 502 depending on the desired output frequency. In some embodiments, a divider control input (e.g., N) can be determined from a look-up table based on a channel indicated by the applications processor 502.

Synthesizer circuitry 506d of the RF circuitry 506 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency ($f_{LO}$). In some embodiments, the RF circuitry 506 can include an IQ/polar converter.

FEM circuitry 508 can include a receive signal path which can include circuitry configured to operate on RF signals received from one or more antennas 510, amplify the received signals and provide the amplified versions of the received signals to the RF circuitry 506 for further processing. FEM circuitry 508 can also include a transmit signal path which can include circuitry configured to amplify signals for transmission provided by the RF circuitry 506 for transmission by one or more of the one or more antennas 510.

In some embodiments, the FEM circuitry 508 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 506). The transmit signal path of the FEM circuitry 508 can include a power amplifier (PA) to amplify input RF signals (e.g., provided by RF circuitry 506), and one or more filters to generate RF signals for subsequent transmission (e.g., by one or more of the one or more antennas 510.

In some embodiments, the device 500 can include additional elements such as, for example, memory/storage, display, camera, sensor, or an input/output (I/O) interface. In addition, the device 500 can include the components discussed herein to further generate or process resource TDMCA operations described, as well as synchronization.

In standalone operations, the IoT or network devices can operate in the unlicensed spectrum for both DL and UL. In anchored TDMCA operations, the devices can operate by using the licensed spectrum for certain channels or data. The split between which channels transmit in the licensed carrier and which channels can be transmitted on the unlicensed carrier can be flexible among various different embodiments.

For example, in the anchored TDMCA operations the synchronization signals (PSS, SSS, etc.) can be transmitted on both carriers (e.g., primary/secondary, licensed/unlicensed), the MIB can be transmitted on the licensed carrier and (then the information can be provided through the network device for the unlicensed carrier as well) U-SIB, U-NPDCCH, U-NPDSCH, U-NPUSCH, UNPRACH can be transmitted in the unlicensed carrier. This can be applicable when both DL and UL carriers in unlicensed spectrum are present, and thus, being utilized as primary or supplemental carriers, for example.

Different from basic synchronization, signaling can occur on both UL and UL carriers with TDMCA operations as a deviation from the NB IoT in just LTE and not standalone, which is processed by TDMA operations with the licensed spectrum only and for contiguous, same channel multi-carrier operation. Rather than only operating on the synchronization channel of the anchored carrier, physical synchronization can be requested on both carriers, and informative cessation to be done on the licensed spectrum. Informative can refer to MIBs and SIBs.

Alternatively or additionally, synchronization signals can be transmitted on both the carriers (e.g., primary/secondary, licensed/unlicensed), MIB and one or more SIBs can be transmitted on the licensed carrier, while one or more of U-NPDCCH, U-NPDSCH, U-NPUSCH, or UNPRACH can be transmitted in the unlicensed carrier. This embodiment can also be applicable when both DL and UL carriers are being utilized in unlicensed spectrum.

Alternatively or additionally, synchronization signals can be transmitted on both the carriers (e.g., primary/secondary, licensed/unlicensed), MIB, one or more SIBs can be transmitted on the licensed carrier, while one or more of U-NPDCCH, U-NPDSCH, U-NPUSCH, UNPRACH can be transmitted in the unlicensed carrier. In response to NPDCCH being transmitted on the licensed carrier, one or more of: U-NPDSCH, U-NPUSCH, or UNPRACH can be transmitted in the unlicensed carrier. This embodiment can also be applicable when both DL and UL carriers are being utilized in unlicensed spectrum. In response to U-NPUSCH and U-NPRACH being transmitted in the licensed spectrum, the unlicensed spectrum can only be used for DL, or vice versa, in other words, in response to the unlicensed spectrum only being used for DL, U-NPUSCH and U-NPRACH can be transmitted in the licensed spectrum. Further, in response to U-NPDSCH being transmitted in the licensed spectrum, the unlicensed spectrum is only used for UL, or, vice versa, in other words, in response to the unlicensed spectrum being used only for UL, U-NPDSCH can be transmitted in the licensed spectrum. Accordingly, the UE/IoT devices can transmit in UL with one or more components according to one or more embodiments herein, and the eNB/WiFi/other IoT sever/other network device or node can transmit in DL with one or more components according to one or more embodiments herein, for example.

In order to allow for a low complexity implementation, the UE/IoT device, or network device is not required to support (inter-band) carrier aggregation alone as defined in legacy LTE RAT, but can support or process a time domain multiplexed multi-carrier as TDMCA operations described herein. This can extend to NB-IoT Multi-Carrier Operation (MCO) principles, in particular, with methods or processes similar to, but not limited to, LAA or enhanced LAA (eLAA) to allow for coexistence with other wireless technologies in the unlicensed spectrum, as well as with methods or processes similar to, but not limited to, inter-frequency Carrier Aggregation or synchronous Dual Connectivity (DC) to allow for non-collocated anchoring in the case of inter-BS backhaul delays of less than about 32 µs, for example. This corresponds to a multi-carrier use without requiring the device to operate simultaneously in multiple different carriers, and can be for both the DL and the UL, or each independently.

Figure 6:
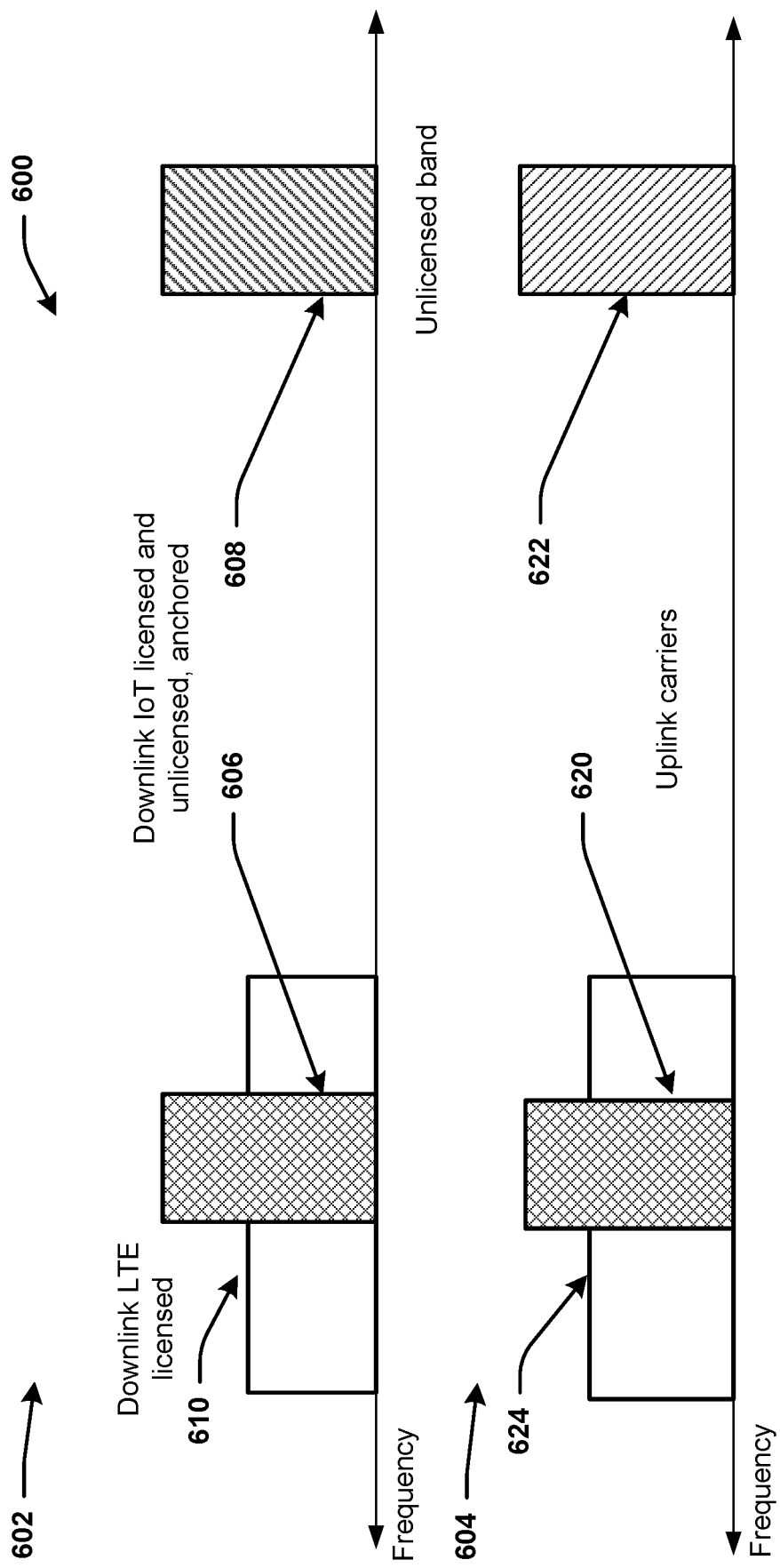
FIG. 6 is another block diagram of component carriers for TDMCA operation according to various aspects or embodiments described herein.

Referring to FIG. 6, illustrates TDMCA approaches 600 for synchronous operations or processed according to one or more aspects/embodiments herein. For example, two carriers 606, 608 can belong to different bands (inter-band TDMCA) (e.g., band 610) or ranges of frequency bands.

In different embodiments, the two carriers 606, 608 can belong to the same band (intra-band TDMCA). In one or more previous embodiments the ideal backhaul is considered, while in a separate embodiment the method proposed for the TDMCA can be extended towards time division multiplexed synchronous dual connectivity TDMCA (DC TDMCA) processes, in which UEs or IoT devices communicate directly among one another, for inter-BS backhaul delays of multiples of milliseconds. Many network vendors indicate that the time alignment errors exceed the limits up to several milliseconds, and such TDMCA operations with synchronous processes of embodiments can remedy/reduce such delay.

A carrier 606 or 608, in one example, can be considered to be any ensemble or group of PRBs (1PRB for U-NB IOT systems, 6 PRBs for eMTC or greater than 6 PRBs for FeMTC. Moreover, in a general embodiment, the time domain carrier aggregation principle of operation could be applicable among a number $N_C$ of different carriers ($C_1, \ldots C_{NC}$) where in one embodiment at least one carrier can be located in the licensed spectrum (e.g., 610, 624 for DL or UL respectively) while another is in the unlicensed band 608 or 622 for DL or UL respectively, while in a different embodiment all the carriers can perform TDMCA operations 602/604 (e.g., at last two) could be in the unlicensed spectrum 608/622 or other unlicensed range (standalone case).

The component carriers 606 and 620 in respective bands 610, 624 can be licensed, while the carriers 608, 622 can be unlicensed bands. FIG. 6 further illustrates a supplemental DL, meaning in the DL operations the unlicensed band can be exploited. This framework can enable U-NB IoT deployments, whereby on the left side both in DL and in UL licensed spectrum is being utilized, while also using this licensed spectrum within the LTE channel 610 or 624, for example. Typically, another carrier (e.g., 608, 622) can be utilized to jump into right next to or contiguous with the carriers 610 624 within the same spectrum 610 or 624. However, here another band or spectrum or channel can be utilized as part of the TDMCA operations that is not contiguous, without first having understanding about the physical synchronization, frequency offset or the time offset in the DL part.

Figure 7:
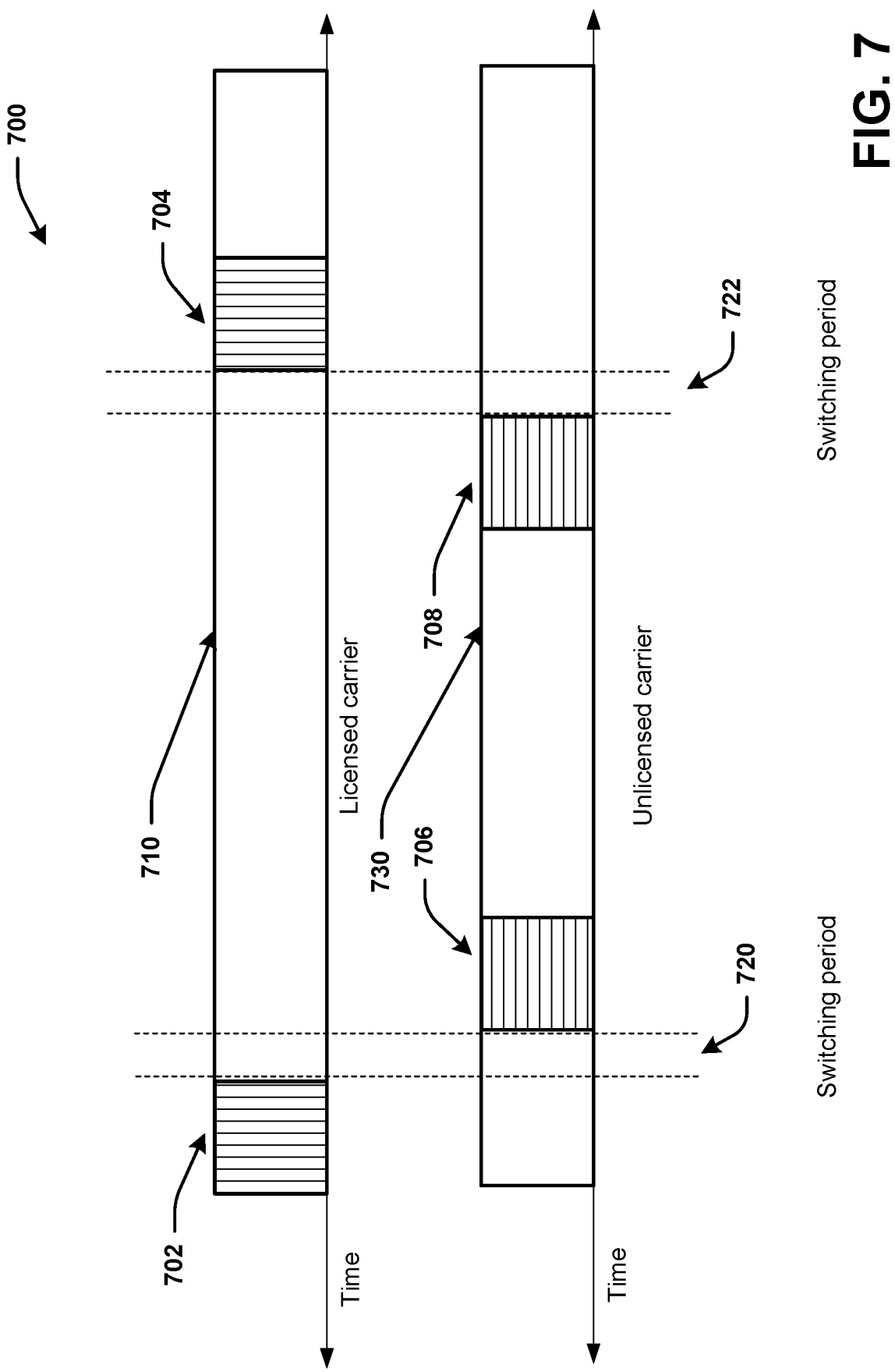
FIG. 7 is another block diagram of component carriers for various TDMCA operations according to various aspects or embodiments described herein.

In one embodiment, switching periods (e.g., 720, 722 of FIG. 7) can also be utilized in a synchronization phase, which can be between half a second and 1.5 seconds, or some other time, when there is a need to switch and then synchronize to the unlicensed carrier at switching period 720, as well as then switch again and synchronize to the licensed carrier at switching period 722, which is illustrated in FIG. 7 as an example.

While FIG. 6 illustrates the situation as would be ideal when synchronizing from an anchored carrier 606, 620 on a licensed band 610 to the unanchored carrier 608, 622 respectively when switching to offload traffic to the unlicensed carrier, for example. In comparison, FIG. 7 illustrates the pause utilized in the time domain as switching gaps 720, 722 in order to tune to the unlicensed carriers 706, 708, for example from the licensed carrier 702 or to the licensed carrier 704, synchronize thereto and operate on it. Further, synchronization can further occur from time to time again or periodically, in response to additional system information (e.g., MIB/SIB, or other data) is obtained/receive, or in response to other reasons, the IoT device can go back to the licensed spectrum (e.g., as the carrier 704 or 702 again), or wait/return back to the licensed spectrum 710 and synchronize again at another switching period 722. Additionally or alternatively, rather than just two carriers 702 or 706, multiple carriers can be utilized as well from 1 to N within the licensed or unlicensed bands, with both unlicensed and licensed bands in UL and DL, for example, in only DL, or only UL, for example.

As such, TDMCA operations herein can simplify and shorten these switching periods 720, 722 of synchronization by foreseeing in operation on the licensed carrier 702/704 smaller gaps 720, 722 that allow a brief sneak into the unlicensed carrier 730, and then before really performing a full synchronization by really tuning to the other frequency, and this is the proposal being made in TDMCA operations with synchronization gaps 720, 722 also. This, for example, can be to avoid requiring the UE/IoT devices to have the burden to the normal support of the carrier where the UE has radiofrequency (RF) and baseband (BB) capability to receive the signals simultaneously over multiple carriers.

In order to avoid requiring the UE to have the burden associated to the normal support of carriers where the UE has RF and BB capability to receive the signal simultaneously over several component carriers various further embodiments can be envisioned.

According to embodiments, an IoT/UE/network device could operate at any time in a single carrier $C_j$ and switch to a carrier $C_m$. These embodiments or aspects can vary depending on whether such operations are related to DL or UL.

In embodiments related to DL, for example, specific and pre-defined patterns can be signaled by the eNB in a semi-static or semi-persistent signaling manner via RRC signaling or a media access control (MAC) control element (CE), for example. In one example, the eNB (e.g., 102, 104, 106, or 108 of FIG. 1) can indicate the complete pattern on the primary cell 124, 126. In another example, the eNB (e.g., 102, 104, 106, or 108 of FIG. 1) can indicate only a first step (or the first 'N' steps) of the sequence or switching pattern between various component carriers, while the subsequent steps can be indicated in the N–x visited carrier via a control signal. Where N and x can be for example predefined numbers that depend on the amount of reinforcement learning (RL) needed, or be fixed numbers, which can correspond to one or more resources or carriers, for example.

In another embodiment, these sequence patterns for operation on carriers herein can be signaled by the eNB in a dynamic way, rather than a semi-persistent or period time. For example, downlink control information (DCI) can be carried by control channels that can be located only on the primary carrier (and hence exploiting the cross carrier scheduling concept which has been defined in the context of legacy LTE) or in any other carrier. According to this embodiment the control channel located in carrier K can indicate the location of the next carrier and where to find the related data, in which can be a positive integer. In this case N can equal 1 and x equal one 1.

In another embodiment, multi-carrier operation can be based on UE/IoT feedback selection. According to this method the UE/IoT could indicate via feedback which of the multi-carriers could correspond to the best channel conditions (measurement computed assuming the presence of discovery reference signals (RSs)). According to one specific example, the UE/IoT could indicate via a bitmap a set of 'M' preferred carriers, the eNB could then indicate then which carrier to use according the eNB based method indicated above. The UE could then use one or more metrics to identify the 'M' best carriers. The metric, for example, can include one or more of a channel reciprocity, which can be based on DL measurements, interference measurements, on path-loss (it could be different in case of non-collocated deployments), or any combination thereof.

In embodiments related to UL, the eNB 102-108 can select the carrier to be used by indication to the UE/IoT device 110-118. The eNB 102-108, for example, can indicate via the use of the downlink grant which carriers should be used for the UE/IoT device 110-118 in NB to start accessing the channel via LBT-like protocols if in unlicensed spectrum or according the eNB allocation in licensed spectrum.

In another embodiment related to UL, the UE/IoT device 110-118 can enable an autonomous selection of the best carrier to be used. For example, the UE/IoT device 110-118 could indicate via a bitmap a set of 'M' preferred carriers, in which the eNB 102-108 could indicate then which carrier to use according the eNB based methods or processed indicated herein. The UE could use the same metrics as above for the selection. The metric, for example, can include one or more of a channel reciprocity, which can be based on DL measurements, interference measurements, on path-loss (it could be different in case of non-collocated deployments), or any combination thereof.

In another example, the eNB 102-108 can indicate the preferred set of carriers via the use of a bitmap and the UE/IoT device 110-118 can select autonomously one of the elements in the set. An identity or identifier of the carriers could be associated to the transmission, which the eNB can exploit in order to blindly detect which carrier has been used. For example, the method could be based on the use of the cyclic redundancy check (CRC), for example. One or more elements of the embodiments described herein can be utilized in combination as well.

The current U-NB IoT solutions introduce multi-carrier operation (MCO) techniques which we could also be referred to as frequency hopping techniques, where certain channels can hop within well-defined maximum frequencies or frequency ranges. The frequency used in NB IoT, for example, could be at about 20 MHz or under, and the maximum span of PRBs could be about 110. The reason for the latter limitation is that the UE/IoT device is not required to synchronize to a new carrier. The difference between the multi-carrier operation (MCO) technique introduced in U-NB IoT and the concept(s) disclosed herein is that the UE/IoT device 110-118 is assuming a regular carrier aggregation procedure where it is assumed that the UE/IoT device 110-118 can be capable of synchronizing over Nc carriers and hence inter-frequency or intra-frequency TDMCA operations can become possible without specific requirements in terms of frequency distance between the carriers the TDMCA operations. This could be outside or exceed 20 MHz and the PRB span.

Figure 8:
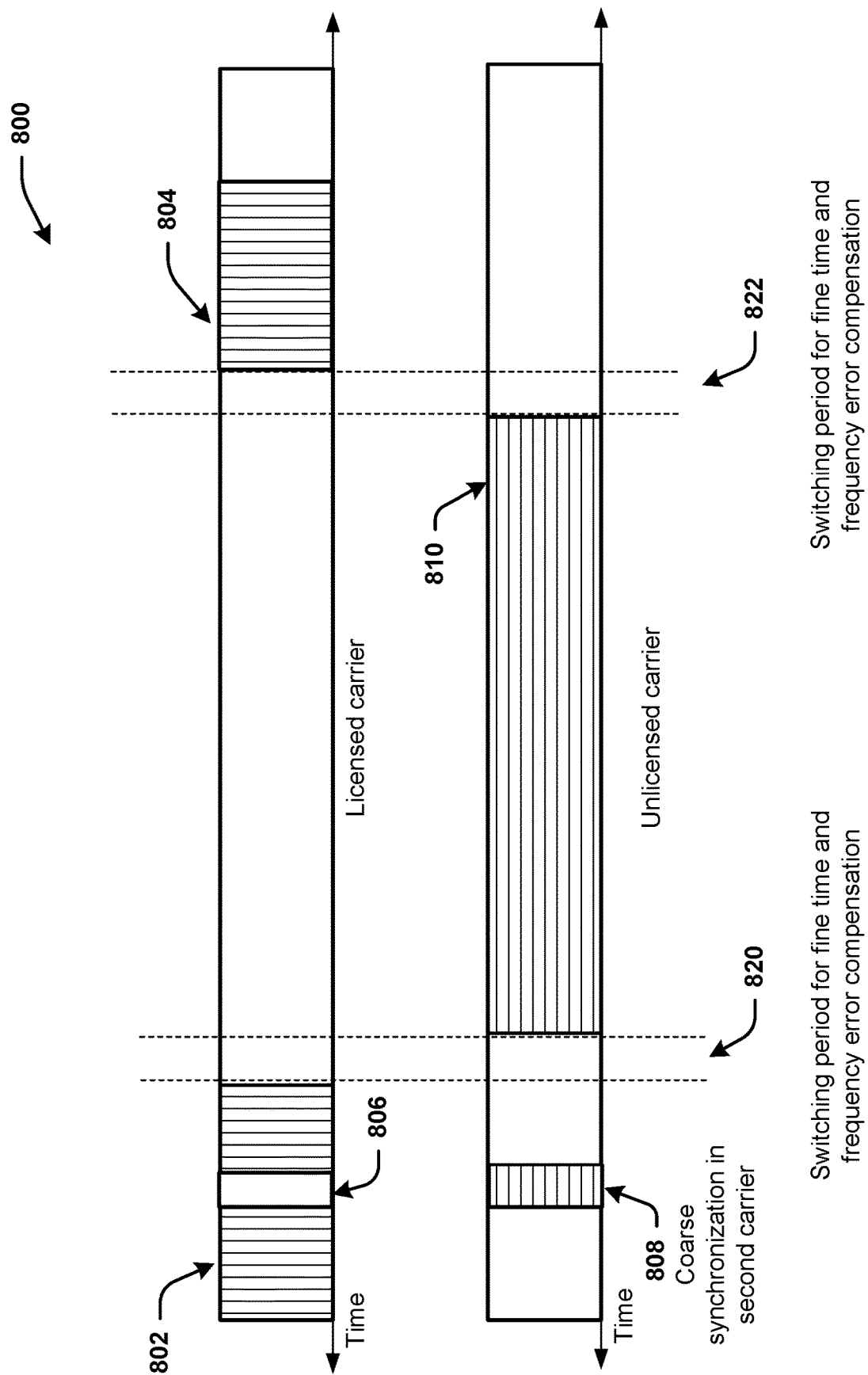
FIG. 8 is another block diagram of component carriers for various TDMCA operations according to various aspects or embodiments described herein.

Referring to FIG. 8, illustrated is another example of different TDMCA operations where the eNB 102-108 can schedule synchronization gaps. In order to avoid requiring the UE/IoT device 110-118 to have the burden associated to the normal support of carrier where the UE/IoT device 110-118 has RF and BB capability to receive the signal simultaneously over several carriers the different methodologies are considered. For example, as shown in FIG. 8 is assumed where the eNB 110-118 can schedule specific synchronization gaps 820, 822 in a specific cell or a second carrier 808 in order to allow the device to acquire coarse synchronizing over the different, second carrier 808 where it needs to hop to as a next step, such as to the unlicensed carrier component 810. Alternatively or additionally, the operation could hop back to the licensed carrier at 802 in the same band after the gap 806, or the component carrier 804 in another band that is noncontiguous to the carrier 802 after operating in the unlicensed carrier (e.g., 810).

The synchronization gap information can be provided to the UE/IoT device 110-118 via an information element message equivalent of MeasGapConfig provided in the radio resource control (RRC) Connection Reconfiguration message, for example. The coarse synchronization can be based on the reception of beacon signals, which can be referred to as Synch Gap-NPSS and possibly Synch-Gap NSSS, for example. In one specific embodiment, the Synch Gap NPSS and NSSS (or Synch Gap U-NPSS and U-NSSS) can correspond to NPSS and NSSS, while in a different embodiment they are specific variant of the NPSS/NSSS or U-NPSS/NSSS.

In an aspect, the pre-synchronization gaps 808, for example, can also be of variable length to simplify enabling of the unlicensed carrier. Where a specific switching time is allowed before switching carrier, a switching period can be defined before and after any switching of carriers to allow the receiver to change the frequency and to apply frequency/time domain compensation.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or pre apart from those illustrated and/or described herein. In addition, not all illustrated acts may be required to implement one or more aspects or embodiments of the description herein. Further, one or more of the acts depicted herein may be carried out in one or more separate acts and/or phases.

Figure 9:
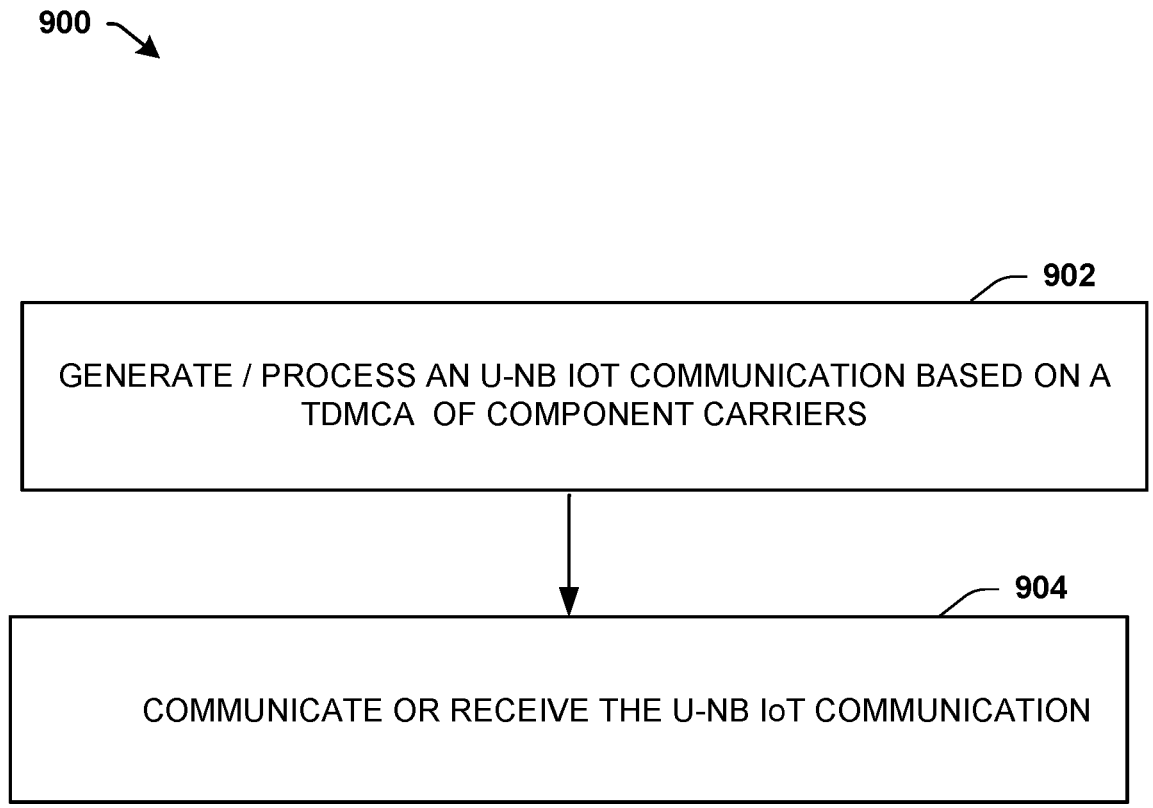
FIG. 9 illustrates a process flow of processing or generating unlicensed narrow band (U-NB) communications for IoT devices according to various aspects or embodiments described herein.

Referring to FIG. 9, illustrated is an example process flow 900 for an IoT device to process or generate a U-NB IoT communications. For example, the method 900 can initiate at 902 with one or more processors, or other component described herein, configured to generate a U-NB IoT communication based on a time domain multiple carrier aggregation of a plurality of component carriers. The plurality of component carriers comprises a component carrier that is anchored to a long term evolution (LTE) licensed band, or the plurality of component carriers entirely comprising unlicensed component carriers that are unanchored to the LTE component carrier in a standalone configuration.

At 904, a radio frequency interface (RF) or communication circuitry for interfacing with RF communications can be configured to communicate the U-NB IoT communication, for example, between an eNB/wireless node or WiFi and a UE/IoT device.

The IoT device can also operate to perform the time domain multiple carrier aggregation of the plurality of component carriers comprising a time domain inter-frequency carrier aggregation among the plurality of component carriers, in which two different carriers can be non-contiguous and in different bands that are not contiguous with one another, for example.

The anchoring of the component carrier can be non-collocated with respect to one or more other component carriers of the plurality of component carriers. For example, the LTE carrier can be from another separate external component or device than the unlicensed carrier.

In other embodiments, the IoT device can generate the U-NB IoT communication by performing a frequency hopping between the component carrier as a licensed component carrier and an unlicensed component carrier based on one or more synchronization signals (e.g., U-NPSS, or U-NSSS, or the like) on the licensed component carrier and the unlicensed component carrier.

In other embodiments, the radio frequency interface can be configured to process, in a downlink (DL) U-NB IoT communication, one or more synchronization signals on both a licensed component carrier and an unlicensed component carrier of the plurality of components carriers, and process at least one of: a master information block (MIB), a system information block (SIB), or an unlicensed narrowband physical downlink control channel (U-NPDCCH) on the licensed component carrier. The radio frequency interface can be further configured, for example, to process a U-NB physical downlink shared channel (U-NPDSCH), a U-NB physical uplink shared channel (U-NPUSCH) and a U-NB physical random access channel (UNPRACH) on the unlicensed component carrier. Additionally or alternatively, the radio frequency interface is further configured to process a U-NPDSCH on the licensed component carrier in response to the unlicensed component carrier being used only for the DL U-NB IoT communication, and process a U-NPUSCH and a UNPRACH on the licensed component carrier in response to the unlicensed component carrier being used only for the UL U-NB IoT communication. The radio frequency interface is further configured to process at least one of: the SIB or the U-NPDCCH on the unlicensed component carrier instead of the licensed component carrier.

Figure 10:
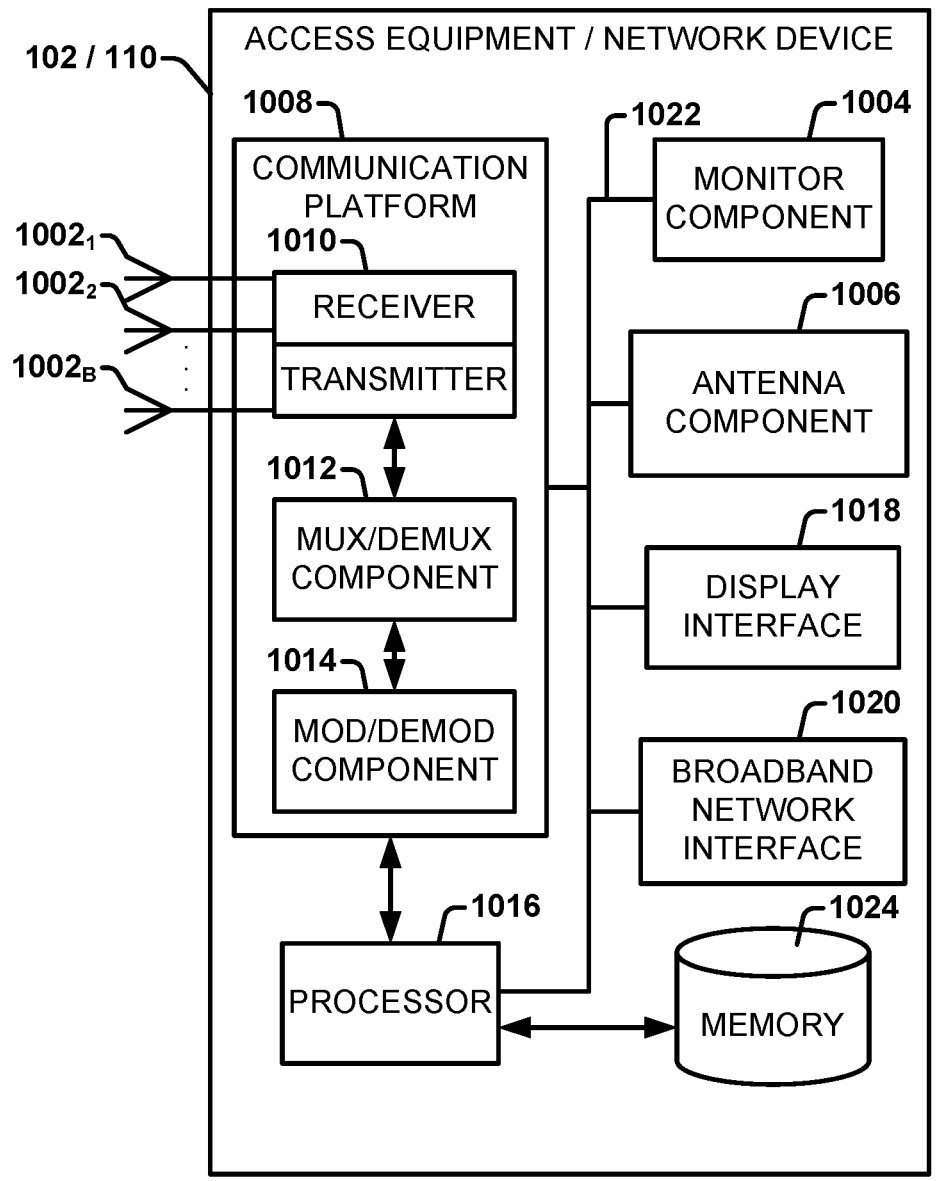
FIG. 10 illustrates another example system or network device operable with one or more components configured for various aspects or embodiments described herein.

To provide further context for various aspects of the disclosed subject matter, FIG. 10 illustrates a block diagram of an embodiment of access (or user) equipment related to access of a network (e.g., network device, base station, wireless access point, femtocell access point, and so forth) that can enable and/or exploit features or aspects disclosed herein.

Access equipment, a network device (e.g., eNB, network entity, or the like), a UE, IoT device or software related to access of a network can receive and transmit signal(s) from and to wireless devices, wireless ports, wireless routers, etc. through segments $1002_1$-$1002_B$ (B is a positive integer) as eNB or IoT device 102/110. Segments $1002_1$-$1002_B$ can be internal and/or external to access equipment and/or software related to access of a network, and can be controlled by a monitor component 1004 and an antenna component 1006. Monitor component 1004 and antenna component 1006 can couple to communication platform 1008, which can include electronic components and associated circuitry that provide for processing and manipulation of received signal(s) and other signal(s) to be transmitted.

In an aspect, communication platform 1008 includes a receiver/transmitter 1010 that can convert analog signals to digital signals upon reception of the analog signals, and can convert digital signals to analog signals upon transmission. In addition, receiver/transmitter 1010 (e.g., receiver/transmitter circuitry) can divide a single data stream into multiple, parallel data streams, or perform the reciprocal operation. Coupled to receiver/transmitter 1010 can be a multiplexer/demultiplexer 1012 that can facilitate manipulation of signals in time and frequency space. Multiplexer/demultiplexer 1012 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 1012 can scramble and spread information (e.g., codes, according to substantially any code known in the art, such as Hadamard-Walsh codes, Baker codes, Kasami codes, polyphase codes, and so forth).

A modulator/demodulator 1014 is also a part of communication platform 1008, and can modulate information according to multiple modulation techniques, such as frequency modulation, amplitude modulation (e.g., M-ary quadrature amplitude modulation, with M a positive integer); phase-shift keying; and so forth).

Access equipment and/or software related to access of a network also includes a processor 1016 configured to confer, at least in part, functionality to substantially any electronic component in access equipment and/or software. In particular, processor 1016 can facilitate configuration of access equipment and/or software through, for example, monitor component 1004, antenna component 1006, and one or more components therein. Additionally, access equipment and/or software can include display interface 1018, which can display functions that control functionality of access equipment and/or software or reveal operation conditions thereof. In addition, display interface 1018 can include a screen to convey information to an end user. In an aspect, display interface 1018 can be a liquid crystal display, a plasma panel, a monolithic thin-film based electrochromic display, and so on. Moreover, display interface 1018 can include a component (e.g., speaker) that facilitates communication of aural indicia, which can also be employed in connection with messages that convey operational instructions to an end user. Display interface 1018 can also facilitate data entry (e.g., through a linked keypad or through touch gestures), which can cause access equipment and/or software to receive external commands (e.g., restart operation).

Broadband network interface 1020 facilitates connection of access equipment and/or software to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1020 can be internal or external to access equipment and/or software and can utilize display interface 1018 for end-user interaction and status information delivery.

Processor 1016 can be functionally connected to communication platform 1008 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1016 can be functionally connected, through data, system, or an address bus 1022, to display interface 1018 and broadband network interface 1020, to confer, at least in part, functionality to each of such components.

In access equipment and/or software memory 1024 can retain location and/or coverage area (e.g., macro sector, identifier(s)) access list(s) that authorize access to wireless coverage through access equipment and/or software sector intelligence that can include ranking of coverage areas in the wireless environment of access equipment and/or software, radio link quality and strength associated therewith, or the like. Memory 1024 also can store data structures, code instructions and program modules, system or device information, code sequences for scrambling, spreading and pilot transmission, access point configuration, and so on. Processor 1016 can be coupled (e.g., through a memory bus), to memory 1024 in order to store and retrieve information used to operate and/or confer functionality to the components, platform, and interface that reside within access equipment and/or software.

In addition, the memory 1024 can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus employed in an internet of things (IoT) device, comprising: one or more processors configured to: generate an unlicensed narrowband (U-NB) IoT communication based on a time domain multiple carrier aggregation of a plurality of component carriers, wherein the plurality of component carriers comprises a component carrier that is anchored to a long term evolution (LTE) licensed band, or the plurality of component carriers entirely comprising unlicensed component carriers that are unanchored to the LTE component carrier in a standalone configuration; and a radio frequency interface configured to communicate the U-NB IoT communication.

Example 2 includes the subject matter of Example 1, wherein the one or more processors are further configured to: perform the time domain multiple carrier aggregation of the plurality of component carriers comprising a time domain inter-frequency carrier aggregation among the plurality of component carriers.

Example 3 includes the subject matter of any one of Examples 1-2, including or omitting any elements as optional, wherein the anchoring of the component carrier is non-collocated with respect to one or more other component carriers of the plurality of component carriers.

Example 4 includes the subject matter of any one of Examples 1-3, including or omitting any elements as optional, wherein the time domain multiple carrier aggregation comprises performing the multiple carrier aggregation based on inter-band and non-contiguous spectrums, respectively.

Example 5 includes the subject matter of any one of Examples 1-4, including or omitting any elements as optional, wherein the one or more processors are further configured to: perform the time domain multiple carrier aggregation with at least one downlink component carrier of the plurality of component carriers and more than one uplink component carrier comprising a UL supplemental carrier in an unlicensed frequency band.

Example 6 includes the subject matter of any one of Examples 1-5, including or omitting any elements as optional, wherein the one or more processors are further configured to: generate the U-NB IoT communication based on a U-NB IoT radio access technology (RAT) by performing a frequency hopping between the component carrier as a licensed component carrier and an unlicensed component carrier based on one or more dynamically or semi-statically configured patterns.

Example 7 includes the subject matter of any one of Examples 1-6, including or omitting any elements as optional, wherein the radio frequency interface is further configured to process, in a downlink (DL) U-NB IoT communication, one or more synchronization signals on both a licensed component carrier and an unlicensed component carrier of the plurality of components carriers, and process at least one of: a master information block (MIB), a system information block (SIB), or an unlicensed narrowband physical downlink control channel (U-NPDCCH) on the licensed component carrier.

Example 8 includes the subject matter of any one of Examples 1-7, including or omitting any elements as optional, wherein the radio frequency interface is further configured to process an U-NB physical downlink shared channel (U-NPDSCH), an U-NB physical uplink shared channel (U-NPUSCH) and an U-NB physical random access channel (UNPRACH) on the unlicensed component carrier.

Example 9 includes the subject matter of any one of Examples 1-8, including or omitting any elements as optional, wherein the radio frequency interface is further configured to process a U-NPDSCH on the licensed component carrier in response to the unlicensed component carrier being used only for the DL U-NB IoT communication, and process a U-NPUSCH and a UNPRACH on the licensed component carrier in response to the unlicensed component carrier being used only for the UL U-NB IoT communication.

Example 10 includes the subject matter of any one of Examples 1-9, including or omitting any elements as optional, wherein the radio frequency interface is further configured to process at least one of: the SIB or the U-NPDCCH on the unlicensed component carrier instead of the licensed component carrier.

Example 11 is an apparatus configured to be employed in a user equipment (UE), comprising: one or more processors configured to: generate an unlicensed narrowband (U-NB) IoT communication based on a time domain multiple carrier aggregation operation comprising an anchored carrier of a long term evolution (LTE) licensed band and an unlicensed carrier, or only unlicensed carriers in a standalone configuration; a communication interface configured to process the U-NB IoT communication.

Example 12 includes the subject matter of Example 11, including or omitting any elements as optional, wherein the communication interface is further configured to receive in a downlink, transmit in an uplink, or receive and transmit the U-NB IoT communication in the downlink and the uplink with one or more synchronization signals concurrently on both a primary carrier and a supplemental carrier based on a U-NB IoT radio access technology (RAT), wherein the primary carrier comprises the anchored carrier or the unlicensed carrier, and the supplemental carrier comprises at least one of the unlicensed carriers.

Example 13 includes the subject matter of Examples 11-12, including or omitting any elements as optional, wherein the one or more processors are further configured to perform the time domain multiple carrier aggregation with the anchored carrier and the unlicensed carrier, or the unlicensed carriers, comprising at least one of: inter-frequency carriers or non-contiguous carriers.

Example 14 includes the subject matter of any one of Examples 11-13, including or omitting any elements as optional, wherein the communication interface comprises a radio frequency chain configured to operate based on only one frequency band, and communicate the U-NB IoT communication for downlink and uplink, wherein the U-NB IoT communication comprises a Cat NB 1 communication, over a low power IoT network.

Example 15 includes the subject matter of any one of Examples 11-14, including or omitting any elements as optional, wherein the communication interface is further configured to: communicate the U-NB IoT communication located between the anchored carrier and the unanchored carrier, or between the unlicensed carriers, based on one or more dynamically or semi-statically configured patterns; and receive the one or more dynamically or semi-statically patterns in a downlink communication based on a radio resource control (RRC) signaling, a medium access control (MAC) control element (MAC CE), or a downlink control information (DCI) for the time domain multiple carrier aggregation operation.

Example 16 includes the subject matter of any one of Examples 11-15, including or omitting any elements as optional wherein the one or more processors are further configured to process at least a portion of the one or more patterns on the downlink communication in a primary carrier, or at least a portion of the one or more patterns on the downlink communication in the primary carrier and a supplemental carrier.

Example 17 includes the subject matter of any one of Examples 11-16, including or omitting any elements as optional, wherein the one or more processors are further configured to generate a feedback communication indicating which component carriers comprises one or more optimal channel conditions for the one or more patterns, wherein the one or more patterns are based on the feedback communication.

Example 18 includes the subject matter of any one of Examples 11-17, including or omitting any elements as optional, wherein the one or more processors are further configured to process one or more downlink grants indicating what carriers from among the anchored carrier and the unlicensed carrier or among the unlicensed carriers to initially access for the U-NB IoT communication.

Example 19 includes the subject matter of any one of Examples 11-18, including or omitting any elements as optional, wherein the one or more processors are further configured to generate a feedback communication comprising a bitmap that selects what carrier is initially being used from among the anchored carrier, the unlicensed carrier or the unlicensed carriers to initially access for the U-NB IoT communication.

Example 20 is an apparatus configured to be employed in an evolved NodeB (eNB), comprising: one or more processors configured to: generate a downlink communication to enable a time domain multiple carrier aggregation operation between an anchored carrier of a long term evolution (LTE) licensed band and an unlicensed carrier for unlicensed narrowband (U-NB) internet of things (IoT) communications; and a communication interface configured to process the downlink communication.

Example 21 includes the subject matter of Examples 21, wherein the one or more processors are configured to transmit one or more synchronization signals on at least one of: the anchored carrier or the unlicensed carrier, wherein the one or more synchronization signals include a synchronization gap information on an information element message, and at least one of: a synchronization gap narrow band primary synchronization signal or a synchronization gap narrow band secondary synchronization signal.

Example 22 includes the subject matter of any one of Examples 20-21, including or omitting any elements as optional wherein the synchronization gap information indicates a switching time to be used before switching between the anchored carrier and the unlicensed carrier.

Example 23 includes the subject matter of any one of Examples 20-22, including or omitting any elements as optional, wherein the one or more processors are configured to transmit at least one of: a master information block (MIB), a system information block (SIB), or an unlicensed narrowband physical downlink control channel (U-NPDCCH) on the anchored carrier.

Example 24 includes the subject matter of any one of Examples 20-23, including or omitting any elements as optional, wherein the U-NPDCCH is transmitted on the anchored carrier in response to the unlicensed carrier being used only in downlink communications associated with the U-NB IoT communications, and receive an unlicensed narrowband physical uplink shared channel (U-NPUSCH) and an unlicensed narrowband physical random access channel (UNPRACH) on the anchored carrier when the unlicensed component carrier is used only for the UL-NB IoT communications based on a U-NB IoT radio access technology (RAT).

Example 25 includes the subject matter of any one of Examples 20-24, including or omitting any elements as optional, wherein the one or more processors are configured to transmit one or more patterns in a downlink communication based on a radio resource control (RRC) signaling, a medium access control (MAC) control element (MAC CE), or a downlink control information (DCI), wherein the one or more patterns indicate which component carriers comprising the anchored carrier and the unlicensed carrier to initiate the U-NB IoT communications.

Example 26 is a computer-readable storage medium storing executable instructions that, in response to execution, cause one or more processors of an internet of things (IoT) device to perform operations comprising:

generating an unlicensed narrowband (U-NB) IoT communication based on a time domain multiple carrier aggregation of a plurality of component carriers, wherein the plurality of component carriers comprises a component carrier that is anchored to a long term evolution (LTE) licensed band, or the plurality of component carriers entirely comprising unlicensed component carriers that are unanchored to the LTE component carrier in a standalone configuration; and communicating the U-NB IoT communication via a radio frequency interface.

Example 27 includes the subject matter of Example 26, wherein the operations further comprise: performing the time domain multiple carrier aggregation of the plurality of component carriers comprising a time domain inter-frequency carrier aggregation among the plurality of component carriers.

Example 28 includes the subject matter of any one of Examples 26-27, including or omitting any elements as optional, wherein the operations further comprise: performing the time domain multiple carrier aggregation with at least one downlink component carrier of the plurality of component carriers and more than one uplink component carrier comprising a UL supplemental carrier in an unlicensed frequency band.

Example 29 includes the subject matter of any one of Examples 26-28, including or omitting any elements as optional, wherein the operations further comprise: processing, in a downlink (DL) U-NB IoT communication, one or more synchronization signals on both a licensed component carrier and an unlicensed component carrier of the plurality of components carriers, and process at least one of: a master information block (MIB), a system information block (SIB), or an unlicensed narrowband physical downlink control channel (U-NPDCCH) on the licensed component carrier.

Example 30 includes the subject matter of any one of Examples 26-29, including or omitting any elements as optional, wherein the operations further comprise: processing an U-NB physical downlink shared channel (U-NPDSCH), an U-NB physical uplink shared channel (U-NPUSCH) and an U-NB physical random access channel (UNPRACH) on the unlicensed component carrier; processing a U-NPDSCH on the licensed component carrier in response to the unlicensed component carrier being used only for the DL U-NB IoT communication, and process a U-NPUSCH and a UNPRACH on the licensed component carrier in response to the unlicensed component carrier being used only for the UL U-NB IoT communication; or processing at least one of: the SIB or the U-NPDCCH on the unlicensed component carrier instead of the licensed component carrier.

Example 31 is a computer-readable storage medium storing executable instructions that, in response to execution, cause one or more processors of a user equipment (UE) to perform operations comprising: generating an unlicensed narrowband (U-NB) IoT communication based on a time domain multiple carrier aggregation operation comprising an anchored carrier of a long term evolution (LTE) licensed band and an unlicensed carrier, or only unlicensed carriers in a standalone configuration; and process the U-NB IoT communication via a communication interface.

Example 32 includes the subject matter of Example 31, wherein the operations further comprise: receiving in a downlink, transmitting in an uplink, or receiving and transmitting the U-NB IoT communication in the downlink and the uplink, with one or more synchronization signals concurrently on both a primary carrier and a supplemental carrier based on a U-NB IoT radio access technology (RAT), wherein the primary carrier comprises the anchored carrier or the unlicensed carrier, and the supplemental carrier comprises at least one of the unlicensed carriers.

Example 33 includes the subject matter of any one of Examples 31-32, including or omitting any elements as optional, wherein the operations further comprise: performing the time domain multiple carrier aggregation with the anchored carrier and the unlicensed carrier, or the unlicensed carriers, comprising at least one of: inter-frequency carriers or non-contiguous carriers.

Example 34 includes the subject matter of any one of Examples 31-33, including or omitting any elements as optional, wherein the operations further comprise: communicating based on only one frequency band, and communicate the U-NB IoT communication for downlink and uplink, wherein the U-NB IoT communication comprises a Cat NB 1 communication, over a low power IoT network.

Example 35 includes the subject matter of any one of Examples 31-34, including or omitting any elements as optional, wherein the operations further comprise: communicating the U-NB IoT communication located between the anchored carrier and the unanchored carrier, or between the unlicensed carriers, based on one or more dynamically or semi-statically configured patterns; and receiving the one or more dynamically or semi-statically patterns in a downlink communication based on a radio resource control (RRC) signaling, a medium access control (MAC) control element (MAC CE), or a downlink control information (DCI) for the time domain multiple carrier aggregation operation.

Example 36 includes the subject matter of any one of Examples 31-35, including or omitting any elements as optional, wherein the operations further comprise: processing at least a portion of the one or more patterns on the downlink communication in a primary carrier, or at least a portion of the one or more patterns on the downlink communication in the primary carrier and a supplemental carrier.

Example 37 includes the subject matter of any one of Examples 31-36, including or omitting any elements as optional, wherein the operations further comprise: generating a feedback communication indicating which component carriers comprises one or more optimal channel conditions for the one or more patterns, wherein the one or more patterns are based on the feedback communication.

Example 38 includes the subject matter of any one of Examples 31-37, including or omitting any elements as optional, wherein the operations further comprise: processing one or more downlink grants indicating what carriers from among the anchored carrier and the unlicensed carrier or among the unlicensed carriers to initially access for the U-NB IoT communication.

Example 39 includes the subject matter of any one of Examples 31-38, including or omitting any elements as optional, wherein the operations further comprise: generating a feedback communication comprising a bitmap that selects what carrier is initially being used from among the anchored carrier, the unlicensed carrier or the unlicensed carriers to initially access for the U-NB IoT communication.

Example 40 is a computer-readable storage medium storing executable instructions that, in response to execution, cause one or more processors of an evolved NodeB (eNB) to perform operations comprising: generating a downlink communication to enable a time domain multiple carrier aggregation operation between an anchored carrier of a long term evolution (LTE) licensed band and an unlicensed carrier for unlicensed narrowband (U-NB) internet of things (IoT) communications; processing the downlink communication via a communication interface.

Example 41 includes the subject matter of Example 40, including or omitting any elements as optional, wherein the operations further comprise: transmitting one or more synchronization signals on at least one of: the anchored carrier or the unlicensed carrier, wherein the one or more synchronization signals include a synchronization gap information on an information element message, and at least one of: a synchronization gap narrow band primary synchronization signal or a synchronization gap narrow band secondary synchronization signal.

Example 42 includes the subject matter of any one of Examples 40-41, including or omitting any elements as optional, wherein the synchronization gap information indicates a switching time to be used before switching between the anchored carrier and the unlicensed carrier.

Example 43 includes the subject matter of any one of Examples 40-42, including or omitting any elements as optional, wherein the operations further comprise: transmitting at least one of: a master information block (MIB), a system information block (SIB), or an unlicensed narrowband physical downlink control channel (U-NPDCCH) on the anchored carrier.

Example 44 includes the subject matter of any one of Examples 40-43, including or omitting any elements as optional, wherein the U-NPDCCH is transmitted on the anchored carrier in response to the unlicensed carrier being used only in downlink communications associated with the U-NB IoT communications, and receive an unlicensed narrowband physical uplink shared channel (U-NPUSCH) and an unlicensed narrowband physical random access channel (UNPRACH) on the anchored carrier when the unlicensed component carrier is used only for the UL-NB IoT communications based on a U-NB IoT radio access technology (RAT).

Example 45 includes the subject matter of any one of Examples 40-44, including or omitting any elements as optional, wherein the operations further comprise: transmitting one or more patterns in a downlink communication based on a radio resource control (RRC) signaling, a medium access control (MAC) control element (MAC CE), or a downlink control information (DCI), wherein the one or more patterns indicate which component carriers comprising the anchored carrier and the unlicensed carrier to initiate the U-NB IoT communications.

Example 46 is an apparatus of an internet of things (IoT) device comprising: means for generating an unlicensed narrowband (U-NB) IoT communication based on a time domain multiple carrier aggregation of a plurality of component carriers, wherein the plurality of component carriers comprises a component carrier that is anchored to a long term evolution (LTE) licensed band, or the plurality of component carriers entirely comprising unlicensed component carriers that are unanchored to the LTE component carrier in a standalone configuration; and means for communicating the U-NB IoT communication via a radio frequency interface.

Example 47 includes the subject matter of any one of Example 46, including or omitting any elements as optional, further comprising: means for performing the time domain multiple carrier aggregation of the plurality of component carriers comprising a time domain inter-frequency carrier aggregation among the plurality of component carriers.

Example 48 includes the subject matter of any one of Examples 46-47, including or omitting any elements as optional, further comprising: means for performing the time domain multiple carrier aggregation with at least one downlink component carrier of the plurality of component carriers and more than one uplink component carrier comprising a UL supplemental carrier in an unlicensed frequency band.

Example 49 includes the subject matter of any one of Examples 46-48, including or omitting any elements as optional, further comprising: means for processing, in a downlink (DL) U-NB IoT communication, one or more synchronization signals on both a licensed component carrier and an unlicensed component carrier of the plurality of components carriers, and process at least one of: a master information block (MIB), a system information block (SIB), or an unlicensed narrowband physical downlink control channel (U-NPDCCH) on the licensed component carrier.

Example 50 includes the subject matter of any one of Examples 46-49, including or omitting any elements as optional, further comprising: means for processing an U-NB physical downlink shared channel (U-NPDSCH), an U-NB physical uplink shared channel (U-NPUSCH) and an U-NB physical random access channel (UNPRACH) on the unlicensed component carrier; means for processing a U-NPDSCH on the licensed component carrier in response to the unlicensed component carrier being used only for the DL U-NB IoT communication, and process a U-NPUSCH and a UNPRACH on the licensed component carrier in response to the unlicensed component carrier being used only for the UL U-NB IoT communication; or means for processing at least one of: the SIB or the U-NPDCCH on the unlicensed component carrier instead of the licensed component carrier.

Example 51 is an apparatus of a user equipment (UE) comprising: means for generating an unlicensed narrowband (U-NB) IoT communication based on a time domain multiple carrier aggregation operation comprising an anchored carrier of a long term evolution (LTE) licensed band and an unlicensed carrier, or only unlicensed carriers in a stand-alone configuration; and means for processing the U-NB IoT communication via a communication interface.

Example 52 includes the subject matter of Example 51, including or omitting any elements as optional, further comprising: means for receiving in a downlink, transmitting in an uplink, or receiving and transmitting the U-NB IoT communication in the downlink and the uplink, with one or more synchronization signals concurrently on both a primary carrier and a supplemental carrier based on a U-NB IoT radio access technology (RAT), wherein the primary carrier comprises the anchored carrier or the unlicensed carrier, and the supplemental carrier comprises at least one of the unlicensed carriers.

Example 53 includes the subject matter of any one of Examples 51-52, including or omitting any elements as optional, further comprising: means for performing the time domain multiple carrier aggregation with the anchored carrier and the unlicensed carrier, or the unlicensed carriers, comprising at least one of: inter-frequency carriers or non-contiguous carriers.

Example 54 includes the subject matter of any one of Examples 51-53, including or omitting any elements as optional, further comprising: means for communicating based on only one frequency band, and communicate the U-NB IoT communication for downlink and uplink, wherein the U-NB IoT communication comprises a Cat NB 1 communication, over a low power IoT network.

Example 55 includes the subject matter of any one of Examples 51-54, including or omitting any elements as optional, further comprising: means for communicate the U-NB IoT communication located between the anchored carrier and the unanchored carrier, or between the unlicensed carriers, based on one or more dynamically or semi-statically configured patterns; and means for receiving the one or more dynamically or semi-statically patterns in a downlink communication based on a radio resource control (RRC) signaling, a medium access control (MAC) control element (MAC CE), or a downlink control information (DCI) for the time domain multiple carrier aggregation operation.

Example 56 includes the subject matter of any one of Examples 51-55, including or omitting any elements as optional, further comprising: means for processing at least a portion of the one or more patterns on the downlink communication in a primary carrier, or at least a portion of the one or more patterns on the downlink communication in the primary carrier and a supplemental carrier.

Example 57 includes the subject matter of any one of Examples 51-56, including or omitting any elements as optional, further comprising: means for generating a feedback communication indicating which component carriers comprises one or more optimal channel conditions for the one or more patterns, wherein the one or more patterns are based on the feedback communication.

Example 58 includes the subject matter of any one of Examples 51-57, including or omitting any elements as optional, further comprising: means for processing one or more downlink grants indicating what carriers from among the anchored carrier and the unlicensed carrier or among the unlicensed carriers to initially access for the U-NB IoT communication.

Example 59 includes the subject matter of any one of Examples 51-58, including or omitting any elements as optional, further comprising: means for generating a feedback communication comprising a bitmap that selects what carrier is initially being used from among the anchored carrier, the unlicensed carrier or the unlicensed carriers to initially access for the U-NB IoT communication.

Example 60 is an apparatus of an evolved NodeB (eNB) comprising: means for generating a downlink communication to enable a time domain multiple carrier aggregation operation between an anchored carrier of a long term evolution (LTE) licensed band and an unlicensed carrier for unlicensed narrowband (U-NB) internet of things (IoT) communications; processing the downlink communication via a communication interface.

Example 61 includes the subject matter of Example 60, including or omitting any elements as optional, further comprising: means for transmitting one or more synchronization signals on at least one of: the anchored carrier or the unlicensed carrier, wherein the one or more synchronization signals include a synchronization gap information on an information element message, and at least one of: a synchronization gap narrow band primary synchronization signal or a synchronization gap narrow band secondary synchronization signal.

Example 62 includes the subject matter of any one of Examples 60-61, including or omitting any elements as optional, further comprising: means for transmitting at least one of: a master information block (MIB), a system information block (SIB), or an unlicensed narrowband physical downlink control channel (U-NPDCCH) on the anchored carrier.

Example 63 includes the subject matter of any one of Examples 60-62, including or omitting any elements as optional, wherein the U-NPDCCH is transmitted on the anchored carrier in response to the unlicensed carrier being used only in downlink communications associated with the U-NB IoT communications, and receive an unlicensed narrowband physical uplink shared channel (U-NPUSCH) and an unlicensed narrowband physical random access channel (UNPRACH) on the anchored carrier when the unlicensed component carrier is used only for the UL-NB IoT communications based on a U-NB IoT radio access technology (RAT).

Example 64 includes the subject matter of any one of Examples 60-63, including or omitting any elements as optional, further comprising: means for transmitting one or more patterns in a downlink communication based on a radio resource control (RRC) signaling, a medium access control (MAC) control element (MAC CE), or a downlink control information (DCI), wherein the one or more patterns indicate which component carriers comprising the anchored carrier and the unlicensed carrier to initiate the U-NB IoT communications.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus employed in an internet of things (IoT) device, comprising:
   one or more processors configured to:
      generate an unlicensed narrowband (U-NB) IoT communication based on a time domain multiple carrier aggregation of a plurality of component carriers, wherein the plurality of component carriers comprises a component carrier that is anchored to a long term evolution (LTE) licensed band, or the plurality of component carriers entirely comprising unlicensed component carriers that are unanchored to the component carrier in a standalone configuration;
      process, in a downlink (DL) U-NB IoT communication, one or more synchronization signals on both a licensed component carrier and an unlicensed component carrier of the plurality of components carriers; and
      process at least one of: a master information block (MIB), a system information block (SIB), or an unlicensed narrowband physical downlink control channel (U-NPDCCH) on the licensed component carrier; and
   a radio frequency interface configured to communicate the U-NB IoT communication.

2. The apparatus of claim 1, wherein the one or more processors are further configured to:
   perform the time domain multiple carrier aggregation of the plurality of component carriers comprising a time domain inter-frequency carrier aggregation among the plurality of component carriers.

3. The apparatus of claim 1, wherein a component carrier of the plurality of component carriers is non-collocated with respect to one or more other component carriers of the plurality of component carriers.

4. The apparatus of claim 1, wherein the time domain multiple carrier aggregation comprises is based on inter-band and non-contiguous spectrums, respectively.

5. The apparatus of claim 1, wherein the one or more processors are further configured to:
   perform the time domain multiple carrier aggregation with at least one downlink component carrier of the plurality of component carriers and more than one uplink component carrier comprising a UL supplemental carrier in an unlicensed frequency band.

6. The apparatus of claim 1, wherein the one or more processors are further configured to:
   generate the U-NB IoT communication based on a U-NB IoT radio access technology (RAT) by performing a frequency hopping between the plurality of component carriers as a licensed component carrier and an unlicensed component carrier based on one or more dynamically or semi-statically configured patterns.

7. The apparatus of claim 1, wherein the radio frequency interface is further configured to process an U-NB physical downlink shared channel (U-NPDSCH), an U-NB physical uplink shared channel (U-NPUSCH) and an U-NB physical random access channel (UNPRACH) on the unlicensed component carrier.

8. The apparatus of claim 1, wherein the radio frequency interface is further configured to process a U-NPDSCH on the licensed component carrier in response to the unlicensed component carrier being used only for the DL U-NB IoT communication, and process a U-NPUSCH and a UNPRACH on the licensed component carrier in response to the unlicensed component carrier being used only for an uplink (UL) U-NB IoT communication.

9. The apparatus of claim 1, wherein the radio frequency interface is further configured to process at least one of: the SIB or the U-NPDCCH on the unlicensed component carrier instead of the licensed component carrier.

10. An apparatus configured to be employed in a user equipment (UE), comprising:
   one or more processors configured to:
      generate an unlicensed narrowband (U-NB) IoT communication based on a time domain multiple carrier aggregation operation comprising an anchored carrier of a long term evolution (LTE) licensed band and an unlicensed carrier, or only unlicensed carriers in a standalone configuration; and
      receive in a downlink, transmit in an uplink, or receive and transmit the U-NB IoT communication in the downlink and the uplink with one or more synchronization signals concurrently on both a primary carrier and a supplemental carrier based on a U-NB IoT radio access technology (RAT), wherein the primary carrier comprises the anchored carrier or the unlicensed carrier, and the supplemental carrier comprises at least one of the unlicensed carriers; and a communication interface configured to process the U-NB IoT communication.

11. The apparatus of claim 10, wherein the one or more processors are further configured to perform the time domain multiple carrier aggregation operation with the anchored carrier and the unlicensed carrier, or the unlicensed carriers, comprising at least one of: inter-frequency carriers or non-contiguous carriers.

12. The apparatus of claim 10, wherein the communication interface comprises a radio frequency chain configured to operate based on only one frequency band, and communicate the U-NB IoT communication for the downlink and the uplink, wherein the U-NB IoT communication comprises a Cat NB 1 communication, over a low power IoT network.

13. The apparatus of claim 10, wherein the one or more processors are further configured to:
communicate the U-NB IoT communication located between the anchored carrier and the unlicensed carrier, or between the unlicensed carriers, based on one or more dynamically or semi-statically configured patterns; and
receive the one or more dynamically or semi-statically patterns in a downlink communication based on a radio resource control (RRC) signaling, a medium access control (MAC) control element (MAC CE), or a downlink control information (DCI) for the time domain multiple carrier aggregation operation.

14. The apparatus of claim 13, wherein the one or more processors are further configured to process at least a portion of the one or more patterns on the downlink communication in the primary carrier, or at least a portion of the one or more patterns on the downlink communication in the primary carrier and the supplemental carrier.

15. The apparatus of claim 13, wherein the one or more processors are further configured to generate a feedback communication indicating which component carriers comprises one or more optimal channel conditions for the one or more patterns, wherein the one or more patterns are based on the feedback communication.

16. The apparatus of claim 10, wherein the one or more processors are further configured to process one or more downlink grants indicating what carriers from among the anchored carrier and the unlicensed carrier or among the unlicensed carriers to initially access for the U-NB IoT communication.

17. The apparatus of claim 13, wherein the one or more processors are further configured to generate a feedback communication comprising a bitmap that selects what carrier is initially being used from among the anchored carrier, the unlicensed carrier or the unlicensed carriers to initially access for the U-NB IoT communication.

18. An apparatus configured to be employed in an evolved NodeB (eNB), comprising:
one or more processors configured to:
generate a downlink communication to enable a time domain multiple carrier aggregation operation between an anchored carrier of a long term evolution (LTE) licensed band and an unlicensed carrier for unlicensed narrowband (U-NB) internet of things (IoT) communications; and
receive in a downlink, transmit in an uplink, or receive and transmit the U-NB IoT communications in the downlink and the uplink with one or more synchronization signals concurrently on both a primary carrier and a supplemental carrier based on a U-NB IoT radio access technology (RAT), wherein the primary carrier comprises the anchored carrier or the unlicensed carrier, and the supplemental carrier comprises the unlicensed carrier; and
a communication interface configured to process the downlink communication.

19. The apparatus of claim 18, wherein the one or more processors are configured to transmit the one or more synchronization signals on at least one of: the anchored carrier or the unlicensed carrier, wherein the one or more synchronization signals include a synchronization gap information on an information element message, and at least one of: a synchronization gap narrow band primary synchronization signal or a synchronization gap narrow band secondary synchronization signal.

20. The apparatus of claim 19, wherein the synchronization gap information indicates a switching time to be used before switching between the anchored carrier and the unlicensed carrier.

21. The apparatus of claim 18, wherein the one or more processors are configured to transmit at least one of: a master information block (MIB), a system information block (SIB), or an unlicensed narrowband physical downlink control channel (U-NPDCCH) on the anchored carrier.

22. The apparatus of claim 21, wherein the U-NPDCCH is transmitted on the anchored carrier in response to the unlicensed carrier being used only in downlink communications associated with the U-NB IoT communications, and receive an unlicensed narrowband physical uplink shared channel (U-NPUSCH) and an unlicensed narrowband physical random access channel (UNPRACH) on the anchored carrier when the unlicensed carrier is used only for uplink (UL)-NB IoT communications based on the U-NB IoT RAT.

23. The apparatus of claim 18, wherein the one or more processors are configured to transmit one or more patterns in the downlink communication based on a radio resource control (RRC) signaling, a medium access control (MAC) control element (MAC CE), or a downlink control information (DCI), wherein the one or more patterns indicate which component carriers comprising the anchored carrier and the unlicensed carrier to initiate the U-NB IoT communications.

* * * * *